US011649088B2

(12) United States Patent
Väin

(10) Patent No.: US 11,649,088 B2
(45) Date of Patent: May 16, 2023

(54) DEVICE AND SYSTEM FOR SECURE PACKAGE DELIVERY BY A MOBILE ROBOT

(71) Applicant: STARSHIP TECHNOLOGIES OÜ, Tallinn (EE)

(72) Inventor: Lauri Väin, Tallinn (EE)

(73) Assignee: STARSHIP TECHNOLOGIES OÜ, Tallinn (EE)

(*) Notice: Subject to any disclaimer, the term of this patent is extended or adjusted under 35 U.S.C. 154(b) by 280 days.

(21) Appl. No.: 16/731,583

(22) Filed: Dec. 31, 2019

(65) Prior Publication Data
US 2020/0130893 A1   Apr. 30, 2020

Related U.S. Application Data

(63) Continuation of application No. PCT/EP2018/069174, filed on Jul. 13, 2018.

(30) Foreign Application Priority Data

Jul. 28, 2017   (EP) .................................... 17183875

(51) Int. Cl.
A47G 29/20    (2006.01)
B65D 25/06    (2006.01)
(Continued)

(52) U.S. Cl.
CPC ............. *B65D 25/08* (2013.01); *A47G 29/20* (2013.01); *B60P 3/007* (2013.01); *B65D 43/20* (2013.01);
(Continued)

(58) Field of Classification Search
CPC .......... A47G 29/20; E09B 9/115; B65D 25/06
See application file for complete search history.

(56) References Cited

U.S. PATENT DOCUMENTS 962,453 A    6/1910 Mossberg et al.
1,238,114 A * 8/1917 Dow ...................... A47G 29/20
                                                        232/41 B
(Continued)

FOREIGN PATENT DOCUMENTS

DE    102005008225 A1 * 8/2006  ............. E06B 9/115
EP    1382273 A1    1/2004
(Continued)

OTHER PUBLICATIONS

Applicant (Starship), Reply to Written Opinion prepared by the EPO, in EP3659104, dated Sep. 22, 2020 (2 pgs.).
(Continued)

*Primary Examiner* — Mollie Impink
(74) *Attorney, Agent, or Firm* — Siritzky Law, PLLC

(57) ABSTRACT

A storage container, comprising a rigid body including a floor, a front wall, a back wall, and side walls, at least one separating wall, and a plurality of fixing elements for removably fixing the separating walls to the storage container. The storage container further comprises a locking element. The container further comprises a plurality of compartments configured to be separated by the separating wall and locked via the locking element. Further, a system comprising a mobile robot and the storage container is disclosed. Also disclosed is a method for secure package delivery employing the system.

9 Claims, 5 Drawing Sheets

(51) Int. Cl.
*B65D 25/08* (2006.01)
*B65D 43/20* (2006.01)
*B65D 43/22* (2006.01)
*G06Q 50/30* (2012.01)
*B60P 3/00* (2006.01)
*G07C 9/30* (2020.01)
*G05D 1/02* (2020.01)

(52) U.S. Cl.
CPC .............. *B65D 43/22* (2013.01); *G05D 1/021* (2013.01); *G06Q 50/30* (2013.01); *G07C 9/30* (2020.01); *B65D 25/06* (2013.01); *B65D 2203/02* (2013.01); *B65D 2203/10* (2013.01); *B65D 2255/00* (2013.01); *B65D 2543/00277* (2013.01); *B65D 2543/00379* (2013.01)

(56) References Cited

U.S. PATENT DOCUMENTS

| | | |
|---|---|---|
| 3,299,978 A | 1/1967 | Sponsler |
| 3,597,036 A * | 8/1971 | Buffington .......... E05B 65/0003 312/219 |
| 3,628,624 A | 12/1971 | Wesener et al. |
| 3,649,981 A | 3/1972 | Woodworth |
| 4,009,761 A | 3/1977 | Meyer |
| 4,166,511 A | 9/1979 | Stedman |
| 4,496,272 A | 1/1985 | Teske |
| 4,513,832 A | 4/1985 | Engman |
| 4,549,841 A | 10/1985 | Ishige |
| 4,817,747 A | 4/1989 | Kopczynski |
| 4,962,453 A | 10/1990 | Pong et al. |
| 4,977,971 A | 12/1990 | Crane, III |
| 4,993,912 A | 2/1991 | King et al. |
| 5,037,159 A | 8/1991 | Nutter |
| 5,086,995 A | 2/1992 | Large |
| 5,248,008 A | 9/1993 | Clar |
| 5,372,211 A | 12/1994 | Wilcox et al. |
| 5,454,129 A | 10/1995 | Kell |
| 5,545,967 A | 8/1996 | Osborne et al. |
| 5,664,928 A | 9/1997 | Stauber |
| 5,942,869 A | 8/1999 | Katou et al. |
| 5,998,963 A | 12/1999 | Aarseth |
| 6,144,180 A | 11/2000 | Chen et al. |
| 6,307,484 B1 | 10/2001 | Sasaki et al. |
| 6,467,293 B1 | 10/2002 | Goosman |
| 6,571,892 B2 | 6/2003 | Kamen et al. |
| 6,602,037 B2 | 8/2003 | Winkler |
| 6,698,788 B2 | 3/2004 | Yang |
| 7,059,625 B2 | 6/2006 | Horacek |
| 7,073,634 B2 | 7/2006 | Mitchell et al. |
| 7,150,340 B2 | 12/2006 | Beck et al. |
| 7,202,776 B2 | 4/2007 | Breed |
| 7,316,405 B2 | 1/2008 | Kritman et al. |
| 7,320,289 B1 | 1/2008 | Clarke |
| 7,364,183 B2 | 4/2008 | Lee |
| 7,426,970 B2 | 9/2008 | Olsen |
| 7,464,775 B2 | 12/2008 | Clemens et al. |
| 7,600,592 B2 | 10/2009 | Goldenberg et al. |
| 7,854,435 B2 | 12/2010 | Campbell |
| 7,894,939 B2 | 2/2011 | Zini et al. |
| 7,931,431 B2 | 4/2011 | Benedict et al. |
| 8,010,230 B2 | 8/2011 | Zini |
| 8,104,601 B2 | 1/2012 | Hayduchok |
| 8,136,270 B1 | 3/2012 | Wammock |
| 8,204,624 B2 | 6/2012 | Zini |
| 8,267,307 B1 | 9/2012 | Leon et al. |
| 8,292,007 B2 | 10/2012 | DeFazio |
| 8,434,838 B2 * | 5/2013 | Zabbatino .............. F25D 25/00 312/407.1 |
| 8,485,285 B2 | 7/2013 | Ferrigni |
| 8,672,065 B2 | 3/2014 | Beck et al. |
| 8,714,669 B1 * | 5/2014 | Clausen .............. A47B 49/004 312/297 |
| 8,800,695 B2 | 8/2014 | Couture |
| 8,839,891 B2 | 9/2014 | Kaloust et al. |
| 8,874,360 B2 | 10/2014 | Klinger |
| 8,882,134 B2 | 11/2014 | Rolicki |
| 8,936,261 B2 | 1/2015 | Yuan |
| 8,948,914 B2 | 2/2015 | Aldo et al. |
| 9,020,632 B2 | 4/2015 | Naylor |
| 9,031,692 B2 | 5/2015 | Dingju |
| 9,056,622 B2 | 6/2015 | Thomas |
| 9,073,637 B2 | 7/2015 | Ohtomo et al. |
| 9,244,147 B1 | 1/2016 | Soundararajan et al. |
| 9,256,852 B1 | 2/2016 | Myllymaki |
| 9,260,127 B2 | 2/2016 | Rolicki |
| 9,266,675 B2 | 2/2016 | Yamashita |
| 9,305,280 B1 | 4/2016 | Berg et al. |
| 9,373,149 B2 | 6/2016 | Abhyanker |
| 9,428,208 B1 | 8/2016 | Chen |
| 9,459,622 B2 | 10/2016 | Abhyanker |
| 9,557,740 B2 | 1/2017 | Crawley |
| 9,561,941 B1 | 2/2017 | Watts |
| 9,567,005 B1 | 2/2017 | Kaloust et al. |
| 9,656,805 B1 | 5/2017 | Evans et al. |
| 9,663,974 B2 * | 5/2017 | Savage ............... E05B 47/0603 |
| 9,682,481 B2 | 6/2017 | Lutz et al. |
| 9,694,976 B1 | 7/2017 | Wurman et al. |
| 9,786,187 B1 | 10/2017 | Bar-Zeev et al. |
| 9,844,879 B1 | 12/2017 | Cousins et al. |
| 2003/0165373 A1 | 9/2003 | Felder et al. |
| 2003/0168825 A1 | 9/2003 | Henderson |
| 2004/0004419 A1 | 1/2004 | Godlewski |
| 2004/0211834 A1 | 10/2004 | Fleckenstein |
| 2004/0232632 A1 | 11/2004 | Beck et al. |
| 2005/0023052 A1 | 2/2005 | Beck et al. |
| 2005/0205329 A1 | 9/2005 | Fanger-Vexler |
| 2005/0207876 A1 | 9/2005 | Springwater |
| 2006/0182580 A1 | 8/2006 | Petersen |
| 2006/0186699 A1 | 8/2006 | Davis |
| 2006/0214634 A1 | 9/2006 | Baba |
| 2006/0237239 A1 | 10/2006 | Bruner et al. |
| 2006/0238159 A1 | 10/2006 | Jung |
| 2006/0254840 A1 | 11/2006 | Strong |
| 2007/0040341 A1 | 2/2007 | Kaloust |
| 2007/0080511 A1 | 4/2007 | Campbell |
| 2007/0110552 A1 | 5/2007 | Groves |
| 2007/0113921 A1 | 5/2007 | Capizzo |
| 2008/0040031 A1 | 2/2008 | Tu |
| 2008/0084284 A1 | 4/2008 | Park et al. |
| 2010/0068021 A1 | 3/2010 | Petersen |
| 2010/0109293 A1 | 5/2010 | Friisdahl |
| 2010/0119343 A1 | 5/2010 | Groves |
| 2010/0191615 A1 * | 7/2010 | Thomas ............... B65D 90/008 52/27 |
| 2011/0036650 A1 | 2/2011 | Simula |
| 2011/0079166 A1 | 4/2011 | Popa-Simil |
| 2011/0132671 A1 | 6/2011 | Lee et al. |
| 2011/0135189 A1 | 6/2011 | Lee |
| 2011/0215192 A1 | 9/2011 | Colantonio |
| 2012/0012416 A1 | 1/2012 | Mirzaie |
| 2012/0090110 A1 | 4/2012 | Van Den Berg et al. |
| 2012/0260944 A1 | 10/2012 | Martins, Jr. et al. |
| 2012/0281053 A1 | 11/2012 | Kubota |
| 2012/0304807 A1 | 12/2012 | Ohruh |
| 2013/0030697 A1 | 1/2013 | Bartels |
| 2013/0110281 A1 | 5/2013 | Jones et al. |
| 2013/0154215 A1 | 6/2013 | Thomas |
| 2013/0305917 A1 | 11/2013 | Heral |
| 2013/0332021 A1 | 12/2013 | Goren |
| 2014/0032034 A1 | 1/2014 | Raptopoulos |
| 2014/0081445 A1 | 3/2014 | Villamar |
| 2014/0136414 A1 | 5/2014 | Abhyanker |
| 2014/0207701 A1 | 7/2014 | Kadaba |
| 2014/0239119 A1 | 8/2014 | Martin |
| 2014/0254896 A1 | 9/2014 | Zhou et al. |
| 2014/0350725 A1 | 11/2014 | LaFary et al. |
| 2014/0365258 A1 | 12/2014 | Vestal et al. |
| 2015/0006005 A1 | 1/2015 | Yu et al. |
| 2015/0015027 A1 | 1/2015 | Wirth |
| 2015/0045945 A1 | 2/2015 | Zini et al. |
| 2015/0088359 A1 | 3/2015 | Choi et al. |
| 2015/0100152 A1 | 4/2015 | Trevino et al. |

(56) References Cited

U.S. PATENT DOCUMENTS

| | | | |
|---|---|---|---|
| 2015/0110344 A1 | 4/2015 | Okumura | |
| 2015/0183528 A1 | 7/2015 | Walsh | |
| 2015/0183581 A1 | 7/2015 | Worsley | |
| 2015/0307329 A1 | 10/2015 | Rosenstrom | |
| 2015/0379468 A1 | 12/2015 | Harvey | |
| 2016/0066732 A1* | 3/2016 | Sarvestani | A47G 29/141 232/24 |
| 2016/0107750 A1 | 4/2016 | Yates | |
| 2016/0144712 A1 | 5/2016 | Olli | |
| 2016/0144734 A1 | 5/2016 | Wang et al. | |
| 2016/0185466 A1 | 6/2016 | Dreano | |
| 2016/0200438 A1 | 7/2016 | Bokeno et al. | |
| 2016/0207710 A1 | 7/2016 | Conrad et al. | |
| 2016/0272020 A1 | 9/2016 | Bill | |
| 2016/0325928 A1 | 11/2016 | Lepek | |
| 2016/0355337 A1 | 12/2016 | Lert et al. | |
| 2016/0368464 A1 | 12/2016 | Hassounah | |
| 2017/0017237 A1 | 1/2017 | Tokuyama et al. | |
| 2017/0050747 A1 | 2/2017 | Wessler | |
| 2017/0096075 A1 | 4/2017 | Henry et al. | |
| 2017/0100837 A1 | 4/2017 | Zevenbergen et al. | |
| 2017/0124512 A1 | 5/2017 | Harvey | |
| 2017/0185853 A1 | 6/2017 | Yokota et al. | |
| 2017/0220981 A1 | 8/2017 | Shucker et al. | |
| 2017/0267452 A1 | 9/2017 | Goren et al. | |
| 2017/0364074 A1 | 12/2017 | Lau et al. | |
| 2017/0368684 A1 | 12/2017 | Zevenbergen et al. | |
| 2018/0005169 A1 | 1/2018 | High et al. | |
| 2018/0020896 A1 | 1/2018 | High et al. | |
| 2018/0024554 A1 | 1/2018 | Brady et al. | |
| 2018/0232839 A1 | 8/2018 | Heinla | |
| 2018/0349834 A1 | 12/2018 | Heinla et al. | |
| 2021/0259449 A1* | 8/2021 | Roselló Ciscar | G07F 9/0235 |

FOREIGN PATENT DOCUMENTS

| | | |
|---|---|---|
| EP | 2 818 958 | 12/2014 |
| GB | 20180232839 | 4/2007 |
| WO | WO 2002/042117 A1 | 5/2002 |
| WO | WO 2005/051279 A1 | 6/2005 |
| WO | WO 2011/035839 A2 | 3/2011 |
| WO | WO 2017/064202 A1 | 4/2017 |
| WO | WO 2017/156586 A1 | 9/2017 |

OTHER PUBLICATIONS

EPO, Communication From Examining Division and Annex, in EP3659104, dated May 18, 2021 (4 pgs.).

Applicant (Starship), Reply to Communication From Examining Division, including letter accompanying subsequently filed items (amended claims and description), in EP3659104, dated Aug. 26, 2021 (5 pgs.).

Applicant (Starship), Amended description with annotations, in EP3659104, dated Aug. 26, 2021 (35 pgs.).

Applicant (Starship), Amended claims with annotations, in EP3659104, dated Aug. 26, 2021 (5 pgs.).

WIPO, International Preliminary Report on Patentability Chapter I, PCT/EP2018/069174, dated Jan. 28, 2020 (8p.).

WIPO, International Search Report, PCT/EP2018/069174, dated Jan. 31, 2019 (4p.).

WIPO, Written Opinion of the International Searching Authority, PCT/EP2018/069174, dated Jan. 31, 2019 (7p.).

Anonymous, "Amazon.de: Rolloschrank 759 Weiss/Weiss", Apr. 23, 2016, Retrieved from the Internet: URL: https://web.archive.org/web/20160423041351/https://www.amazon.de/an-Original-by-Storado-Rolloschrank/dp/B0058N7GFG.

Baker: "Automated Street Crossing for Assistive Robots" Proceedings of the 2005 IEEE, Jun. 28-Jul. 1, 2005.

Pettitt, Jeniece "Forget delivery drones, meet your new delivery robot", Nov. 2, 2015, Retrieved from the Internet: URL: https://www.cnbc.com/2015/11/02/forget-delivery-drones-meet-your-new-delivery-robot.html.

Anonymous: "Lieferroboter Starship: "Klauen würde ich ihn nicht" Auto—Tagesspiegel" ("I wouldn't steal him") Nov. 29, 2015, Retrieved from the Internet: URL: http://www.tagesspiegel.de/mobil/lieferroboter-starship-klauen-wuerde-ich-ihn-nicht/12647114.html, English translation.

DHL Trend Research, "Self-Driving Vehicles in Logistics," Dec., 2014, Markus Kückelhaus et al. [downloaded from http://www.dhl.com/content/dam/downloads/g0/about_us/logistics_insights/dhl_self_driving_vehicles.pdf; archived Web version available on https://web.archive.org/web/20151018154844/http://www.dhl.com/content/dam/downloads/g0/about_us/logistics_insights/dhl_self_driving_vehicles.pdf].

Coxworth, Ben, "HorseFly delivery drone would use a van as its base-on-the-go", Jun. 6, 2014.

Move over Amazon! Packages could one day be delivered by unicycle drones that swarm together to transport heavy parcels, dated Aug. 21, 2015, by Richard Gray [http://www.dailymail.co.uk/sciencetech/article-3205933/Move-Amazon-Packages-one-day-delivered-unicycle-drones-swarm-transport-heavy-parcels.html].

* cited by examiner

DEVICE AND SYSTEM FOR SECURE PACKAGE DELIVERY BY A MOBILE ROBOT

RELATED APPLICATIONS

This application is a continuation of PCT/EP2018/069174, filed Jul. 13, 2018 which claims priority to European (EP) patent application no. 17183875.8, filed Jul. 28, 2017, the entire contents of both of which are hereby fully incorporated herein by reference for all purposes.

FIELD

The invention relates to package delivery. More specifically, the invention relates to secure package delivery by a mobile robot. Even more specifically, the invention relates to individual lockable compartments for packages within a mobile delivery robot.

INTRODUCTION

Delivering packages is an ever growing industry around the world. Traditionally, delivery to the end customer is done by a courier. For example, many deliveries are transported by a truck or car and then brought to the front door by the driver. However, in the last few years, there have been many efforts to further automate the delivery industry, particularly last-mile delivery. Increasingly, customers prefer to receive their ordered packages outside of normal working hours (as they may be working themselves), on the weekends and holidays, as well as on short notice. Therefore, providing ways to deliver items during those hours or on a shorter notice can present several advantages from cost saving, to energy saving and delivery time optimization. One way to do it is to implement drones—flying robots capable of carrying a certain weight in packages. However, drones present several large disadvantages. For one, noise pollution due to the drones' rotating blades is a growing concern. Another problem is the danger of a drone malfunctioning and crashing on to the ground, resulting in potential injuries or property damage. Several other disadvantages such as privacy concerns or the large energy expenditures also arise. Therefore, it is particularly desired to have alternatives for unmanned package delivery. A promising alternative is ground-based delivery robots. Such robots can be relatively small, travel on sidewalks or other pedestrian walkways, and drive autonomously and/or semi-autonomously. Using a computer vision system based on several redundant sensors and sophisticated analysis algorithms, the mobile robots can navigate to their destination within a radius of a few kilometers, making them perfect candidates for autonomous last-mile delivery. The robots can be virtually silent, use little energy, be cheap to produce, and deliver packages at any time convenient for the recipient.

Ground-based delivery robots can also generally carry more weight than drones at a lower energy cost. This can mean, that such mobile robots can deliver several packages during a single run. Therefore, it can be advantageous for such ground-based robots to comprise multiple lockable compartments for storage of individual packages.

Another option for autonomous package delivery are self-driving cars and tracks. Those can navigate on car roads and move at a high speed. Such autonomous vehicles often comprise a plurality of individually accessible package compartments.

For example, U.S. Pat. No. 9,256,852 B1 discloses a package delivery platform. An autonomous road vehicle is operative to receive destination information, and to drive to a destination based on the destination information. A package securing subsystem is attached to the autonomous road vehicle and comprises at least one securable compartment. Each securable compartment is operative to secure at least one package therein. Each securable compartment is associated with compartment access information.

However, last-mile delivery can be made more efficient and less energy consuming by using smaller delivery robots using pedestrian walkways and operating over short distances. Furthermore, smaller delivery vehicles can be more maneuverable and able to access spaces that autonomous road vehicles cannot.

This is partially addressed in US patent application 2015/0006005, which discloses an autonomous unmanned road vehicle and how it can be used to make deliveries. The unmanned vehicle is capable of operating autonomously on paved roadways. The vehicle has a control system for autonomous driving and a perception system for detecting objects in its surroundings. The vehicle also has one or more cargo compartments for carrying the delivery items. In consideration that the vehicle does not carry passengers, the size and/or motor power of the vehicle may be reduced as compared to conventional passenger vehicles.

As discussed in the application, the vehicles are mostly intended to operate on car roads, although they can potentially be reduced in size in comparison with traditional passenger vehicles.

Delivery robots operating on pedestrian walkways such as sidewalks are on the rise. As mentioned previously, it would be advantageous for such robots to comprise multiple individually accessible packages for delivery. Robots comprising several individually accessible and lockable compartments can also significantly increase the efficiency of robotic deliveries. For example, one robot can deliver two or more packages to different recipients at nearby locations during a single run. The cost per delivery would then significantly decrease.

For example, U.S. Pat. No. 9,373,149 discloses an autonomous neighborhood vehicle controllable through a neighborhood social network. In one embodiment, the autonomous neighborhood vehicle can comprise a storage compartment. The storage compartment may have compartments (e.g., separate sections capable of being maintained at different temperatures and/or humidity, trays, compartmentalized areas) and/or may have separate openings on the surface of the storage compartment for each compartment(s).

The patent discloses some embodiments for multiple compartments contained within a delivery robot. However, the compartments disclosed therein appear to be of a fixed size and may not be optimal for packages of different sizes.

SUMMARY

In light of the prior disclosures and the disadvantages associated with them, it is the object of the present invention to disclose a multi-compartment storage container. It is also the object of the present invention to disclose a storage container with individually lockable compartments. It is further the object of the present invention to disclose a delivery robot equipped with a multi-compartment storage container for secure delivery of packages to recipients.

The present invention is specified in the claims as well as in the below description. Preferred embodiments are particularly specified in the dependent claims and the description of various embodiments.

In a first embodiment, the invention discloses a storage container. The storage container can be preferably used for secure item delivery. The storage container comprises a rigid body comprising at least a floor, a front wall, a back wall, a first side wall and a second side wall. The word rigid refers to materials that cannot readily be deformed by an application of force consistent with normal use. For example, materials such as plastic, metal, alloys or similar materials can be used. The storage container further comprises at least one separating wall. The container also comprises a plurality of fixing elements configured to removably fix separating walls to the storage container between the front wall and the back wall. The container further comprises at least one locking element. The body of the storage container also comprises a plurality of compartments separated by the at least one separating wall and configured to be individually lockable via the locking element.

Note, that the compartments are delimited by the walls of the storage container and by the separating walls. That is, the container comprises one compartment more than the number of separating walls in use. The particular advantage is that the number of compartments can be adjusted based on the size of items to be delivered. The separating walls can also be placed at different locations and fixed to different fixing elements, leading to an even increased flexibility in compartment size. The locking element allows for secure package or item delivery, since the compartments are individually locked. One recipient would not be able to access the compartment with items or packages addressed to another recipient, thus increasing the safety and privacy of deliveries.

In some embodiments, each separating wall and at least one of the front wall and the back wall can comprise a roll fixedly attached at or near the top of each separating wall and at or near the top of at least one of the front wall and the back wall, said roll configured to assume at least a rolled up position and a plurality of extended positions. That is, the roll can be attached around the top of a separating wall, and can be unrolled approximately in the plane perpendicular to it. That is, when fully unrolled, the roll and the separating wall would comprise an approximately straight angle between them. The extended positions of the roll can correspond to different stages of being unrolled. The rolled up position can correspond to the position where the roll is fully or mostly rolled up, and is located closest to the separating wall to which it is attached in its entirety.

In some embodiments, each of the extended positions of the rolls can correspond to a different length of the roll measured from the wall that it is attached to until the furthest most point of the roll.

In some embodiments, each of the rolls can be configured to serve as lids of the compartments comprising different lengths based on the length of the respective container, and wherein different lid lengths correspond to different extended positions of the rolls. In other words, the rolls can be unrolled to a certain length from one wall (separating or one of front wall and back wall) until the next wall, so that the unrolled part of the roll covers the container in a way that a lid would. This can be particularly useful, since the rolls can serve as lids of different sizes, limited only by the total length of the roll. As discussed below, the rolls can be locked onto the opposite walls or in another way in such a way so as to prevent them from rolling back or being unrolled without first being unlocked.

In some embodiments, the rolls can be manufactured at least partially from at least one of metal and a ferromagnetic material. That is, the rolls can be acted on with an electromagnet. This can be advantageous when the means of locking the rolls in place comprises an electromagnet.

In some embodiments, the rolls can comprise slats. That is, the rolls can be similar to garage doors or shop front shutters. This can be advantageous, as such rolls would be sturdy and resistant to tampering.

In some embodiments, the rolls can comprise metal mesh. In some such embodiments, the rolls can comprise two layers of metal mesh with at least one further material placed between, below and/or on top of them. The metal mesh rolls can be more flexible, and therefore allow for more different lengths of the lid in the unrolled configuration. Furthermore, the metal mesh rolls can also be sturdy and difficult to open without unlocking the rolls. The fabric between the rolls can serve to shield and conceal the contents of the containers from unauthorized persons.

In some embodiments, the rolls can comprise a roll fastener located on or near the edge and configured to fasten the roll in the extended positions. The roll fastener can comprise a hook or a similar component. It can hook or otherwise attach to a corresponding component on the opposite wall, or to the wall itself. The roll fastener can be advantageous, as it can provide an easy way to prevent the roll from rolling back, and allow for a simpler lock or locking element to lock the rolls in place and therefore lock the compartments. The roll fastener can be disengaged by simply lifting or pulling it away from the opposite wall where it is fastened. A simple solenoid-type lock can be used in combination with a roll fastener. The solenoid lock can be located on the wall where the roll is fixedly attached and can comprise a bolt that prevents the roll from unrolling further or rolling back when the bolt is in place. Additionally or alternatively, the solenoid lock can be located on the opposite wall, where the roll fastener is fastened, and can prevent the roll fastener from being unfastened when in a locked state.

In some embodiments, each separating wall and at least one of the front wall and the back wall can comprise a removable lid configured to assume at least an extended and a retracted position. In such embodiments, each of the removable lids can comprise foldable lids. Such lids can comprise slats as described above. In this embodiment, the slats need not roll into rolls, but can fold along the wall that they are attached to, similarly to garage or storefront doors. That is, the slats can fold in such a way that they are parallel or substantially parallel to the wall that comprises them. In some such embodiments, the slats can be configured to expand over the respective compartment in the extended position so as to make the compartments inaccessible. The slats can also be configured to fold along the respective separating wall and at least one of the front wall and the back wall in the retracted position so as to make the compartments accessible. That is, similarly to the rolls embodiment described above and below, the slats can comprise flexible and modular lids of the individual compartments. In the extended position, the slats can be substantially perpendicular to the wall that they are attached to, and in the retracted position, substantially parallel to it. The slats can otherwise comprise any features described in connection to the rolls above and below. These features include the locking means to the opposite wall across the compartment, handles or similar means to facilitate the opening of the lid formed by slats and other features. In such embodiments, each removable lid can comprise a plurality of extended positions corresponding to different length of the compartments. This advantageously allows for flexibility in compartment size and quick modification of it based on the needs.

In some embodiments, the locking element of the storage container can be located at or near the top of at least one of the front wall, the back wall, the separating walls and the side walls. That is, the locking element can be located where it is convenient to lock the rolls—either on the side where the roll is fixedly attached, or on the opposite side towards which the roll is unrolled to lock the compartment.

In some embodiments, each of the rolls can be configured to be locked to the locking element in each of the extended positions. That is, the rolls can be locked and prevented from being further rolled out or rolled back at different lengths of the rolls. This can be particularly advantageous to ensure the flexibility in the length of the compartments, so that the rolls forming the lids can serve as lids of different lengths. The way to achieve this can be to have the locking element prevent the rolls from unrolling further or rolling back by blocking the rotation of the remaining roll (for example, by using a solenoid-type lock with a bolt that stops roll rotation when extended). Additionally or alternatively, the free end of the roll can be blocked from unrolling further or rolling back by a similar solenoid-type lock (either via the roll fastener or without it).

In some embodiments, each of the rolls can be configured to be locked to the respective locking element and upon locking of the respective roll to the respective locking element, the respective compartment is inaccessible until unlocking. That is, the rolls cab serve as lids of the compartments and prevent unauthorized persons to access it.

In some embodiments, the locking element can comprise an electronic lock, preferably an electromagnetic lock, even more preferably a solenoid-based lock. Such a type of lock can be easy to install and maintain, be compact and light, as well as secure.

In some embodiments, the locking element can comprise at least one motor. That is, the lock can comprise a bolt or latch that can be moved between a locked and unlocked states by the motor. This type of lock can also be lightweight, small and easy to procure.

In some embodiments, the locking element can be configured to provide positive engagement between the rolls and the locking element. That is, in such embodiments, the locking element can stay locked even after experiencing vibrations or shocks. This can be particularly advantageous, since the container is preferably used for deliveries, and is likely to experience such forces during transportation.

In some embodiments, at least one of the front wall, the back wall, the side walls and the separating walls can comprise a wall fastener located at or around the top of the respective wall and configured to receive the roll fastener so as to fasten the roll to the respective wall in each of the extended positions. The wall fastener can comprise a hook, an indentation, a hoop or loop, or another component that the roll fastener can fasten to.

In some embodiments, the fixing elements of the storage container can be located in the body of the container. That is, the fixing elements can be inbuilt into the body. In some such embodiments, the fixing elements can comprise slots, preferably with a snap lock mechanism. That is, the fixing elements can comprise indentations or grooves and further comprise a mechanism that allows the separating walls to be easily fixed to the slots. The snap lock mechanism can be such that the separating walls can be easily put in, but not easily taken out, except by authorized persons. In some such embodiments, the lock can comprise a spring loaded solenoid. This can be convenient, since the separating walls can be locked into the fixing elements and only unlocked by authorized persons, ensuring the integrity of the compartments during the delivery process.

In some embodiments, the fixing elements can be spaced with an interval of 2 to 7 cm. That is, the separating walls can be fixed to the container with such separation. Such a range can provide particular flexibility in the resulting compartment length.

In some embodiments, each fixing element fixing a separating wall can be configured to withstand a separating force of at least 100 N, such as at least 500 N, more preferably at least 1000 N. That is, the fixing elements or the locks locking the separating walls to the fixing elements can be such that they would withstand attempts to tamper with them and to remove a separating wall without authorization.

In some embodiments, each fixing element fixing a separating wall is configured to be released, thereby releasing the separating wall. In some such embodiments, the release mechanism of the fixing elements can be concealed from unauthorized persons. That is, the release mechanism can be on the outside of the container, or require a special tool to access.

In some embodiments, the fixing elements can be configured to removably fix separating walls to the storage container substantially perpendicularly to at least one of the side walls and the floor. In other words, when fixed to the fixing elements, the separating walls can be substantially parallel to the front and back walls. This would result in compartments of rectangular shape and different length.

In some embodiments, each roll further comprises a biasing element configured to bias the roll towards the rolled up position. In some such embodiments, the biasing element comprises a spring. In some such embodiments, the biasing element comprises at least one of a mainspring and a torsion spring. The spring can be beneficial, as it can serve to spool the roll back into a rolled position. When the roll is locked via the locking element, the spring force would not be sufficient to spool the roll back. When the roll is unlocked and no other impediment is present (such as the roll fastener fastened to the wall fastener), the spring can ensure that the roll is rolled-up and not hindering access to the compartment.

In some embodiments, the compartments of the storage container can comprise a variable length dependent on the placement of the separating walls within the storage container. As described above, the separating walls can be fixed to the fixing elements. Therefore, depending on which fixing element a separating wall is fixed into, the resulting compartment can comprise a different length. The advantage is increased flexibility in the sizes of the compartments.

In some embodiments, each separating wall can comprise a width of 0.1 to 2 cm, preferably of 0.1 to 1 cm. The walls can be made of plastic, or of several layers including a carbon fiber reinforcement, or a metal reinforcement. Depending on the material, the separating walls can be thinner or thicker. For example, separating walls made with carbon fiber reinforced plastic can be thinner and still withstand tampering or normal wear from use. The thinner the separating walls are, the more space there is in the container, optimizing space for items or packages and increasing efficiency.

In some embodiments, the container can be configured to comprise from two to ten compartments, preferably from two to five compartments. That is, the maximum amount of compartments in a container can be from two to ten. During a given delivery run, the container can comprise one or two compartments, but if needed, that number can be increased up to ten (depending on the sizes of items to be delivered). As the container is preferably used as part of a delivery robot, the maximum length of the container is determined by the maximum reasonable length of the robot travelling on sidewalks. Therefore, the container is preferably no more than about 80 cm long. For such a container, 10 compartments would result in a length of about 7 cm per compartment—enough for smaller items of packages such as books. Compartments smaller than 7 cm can be inconvenient to access and therefore can be impractical.

In some embodiments, each compartment can comprise a length determined by the placement of the separating walls and by the total length of the container, and wherein each compartment is individually lockable by unrolling the respective roll across the top of the respective compartment and locking the respective roll fixedly attached to one of the compartment walls onto the locking element located on the opposite wall from the respective roll, thereby creating a respective lid with a total length equal to the respective compartment length and corresponding to one of the respective rolls' extended positions.

In some embodiments, the storage compartment can further comprise at least one compartment indicator configured to indicate which compartment can be accessed at a given time. In some such embodiments, the compartment indicator can comprise at least one of a LED and a display. The indicator can, for example, light up in green to indicate that a certain compartment is unlocked can be opened. Additionally or alternatively, an arrow can be displayed via a display indicator or an LED indicator shaped like an arrow. The indicator can be located on the separating walls and at least one of the front wall and back wall. Each compartment can have its own indicator. The indicator can be particularly useful in embodiments where the compartment does not open automatically (that is, the roll does not automatically spool back once the compartment is unlocked), and some action from the delivery recipient is needed to access the compartment.

In embodiments where the roll fastener and wall fastener are used to fasten the roll on the opposite wall, the delivery recipient may need to manually pull or lift the roll to access the compartment once it is unlocked. In such embodiments, the indicator can be particularly useful to direct the recipient's attention to both the compartment that is unlocked and the roll fastener that needs to be unfastened.

In some embodiments, the compartment indicator can comprise a mechanical indicator configured to automatically switch between open and closed indicator states based on the locking element being respectively open and closed. That is, the compartment indicator can be part of or an add-on to the locking element. The indicator can comprise two colors (such as green for open and red for closed), words "open" and "closed", or other easy-to-interpret indications that a certain compartment can be accessed.

In some embodiments, at least one of the side walls of the container comprise a guiding element configured to guide the rolls into the extended positions. In some such embodiments, the guiding element can comprise a groove running along at least one of the side walls at or near the top of the container at the level of the rolls in the extended positions. That is, the guiding element can comprise a groove or two grooves running along the opposite side walls. As the rolls are unrolled to form the lids, the rolls can follow the grooves to maintain a certain level of height and for ease of unrolling and rolling back.

In some embodiments, each compartment can further comprise at least two compartment sensors configured to detect whether the respective compartment is locked or unlocked. In some such embodiments, the compartment sensors can comprise at least one of an opto interrupter, a photo interrupter, a magnetic sensor and an inductive sensor. The sensor can be placed on the separating walls and on one of the front wall and the back wall, on the floor, on the roll, on the sidewalls, or elsewhere in the container. The compartment sensor can be particularly useful in case of any malfunction and accidental compartment unlocking, or tampering.

In some embodiments, the storage container can comprise a volume of 50 to 150 liters. Preferably, it can comprise a volume of 50 to 100 liters, such as 50 to 80 liters. It can comprise a length of about 30 to 80 cm, preferably 30 to 70 cm, more preferably about 35 to 50 cm. The storage container according can comprise a width of about 20 to 70 cm, preferably 20 to 60 cm, more preferably about 30 to 50 cm. The storage container can comprise a height of about 20 to 60 cm, preferably 20 to 50 cm, more preferably about 30 to 50 cm. Such dimensions can be particularly optimized for the storage container to fit into a delivery robot. The robot can be designed to walk on sidewalks and other pedestrian walkways, and therefore should comprise reasonably compact dimensions. On the other hand, the volume of the storage container should be maximized, in order to allow for items or packages of larger sizes to be transported.

In a second embodiment, the invention discloses a system configured for secure item delivery to recipients at delivery locations. The system comprises a mobile robot configured to at least carry items. The robot comprises a robot body comprising a robot item space. The robot further comprises a storage container configured to fit within the robot item space. The storage container comprises a rigid body comprising at least a floor, a front wall, a back wall, a first side wall, and a second side wall. The storage container further comprises at least one separating wall. The storage container also comprises a plurality of fixing elements configured to removably fix separating walls to the storage container between the front wall and the back wall. The storage container further comprises at least one locking element. The body of the storage container also comprises a plurality of compartments separated by the at least one separating wall and configured to be individually lockable via the locking element.

The storage container described in relation to the present embodiment can comprise any of the features or elements listed in the above description.

In some embodiments, the robot can be at least one of an autonomous and a semi-autonomous robot. That is, the robot can be configured to navigate to different delivery locations at least semi-autonomously. Semi-autonomously can refers to the amount of time and/or distance that the robot is configured to drive on its own. That is, the robot can be configured to drive autonomously at least 50% of the time. In a preferred embodiment, the robot can be configured to drive autonomously unless faced with a difficult and/or dangerous task (such as crossing the road).

Note, that as used herein, the terms autonomous or semi-autonomous robot can be used to mean any level of automation depending on the task that the robot is performing. That is, the robot can be adapted to function autonomously or semi-autonomously for most of the tasks, but can also be remotely controlled for some other tasks. Then, the robot would be non-autonomous during the time it is controlled, and then autonomous and/or semi-autonomous again when it is no longer controlled. For example, the robot can assume any of the levels of automation as defined by the Society of Automotive Engineers (SAE), that is, the levels as given below.

Level 0—No Automation
Level 1—Driver Assistance
Level 2—Partial Automation
Level 3—Conditional Automation
Level 4—High Automation
Level 5—Full Automation Though the levels usually refer to vehicles such as cars, they can also be used in the context of the mobile robot. That is, Level 0 can correspond to a remote terminal fully controlling the robot. Levels 1-4 can correspond to the remote terminal partially controlling the robot, that is, monitoring the robot, stopping the robot or otherwise assisting the robot with the motion. Level 5 can correspond to the robot driving autonomously without being controlled by a remote terminal such as a server or a remote operator (in this case, the robot can still be in communication with the remote terminal and receive instructions at regular intervals).

In some embodiments, the robot can be configured to navigate on pedestrian walkways. That is, the robot can navigate and drive at least semi-autonomously on sidewalks and other similar walkways.

In some embodiments, the robot including the carried items weighs no more than 40 kg. That is, the robot can weigh around 25 kg and be configured to carry items weighing up to 15 kg. This is particularly advantageous in case of accidental collisions with pedestrians or animals: since the robot is fairly light and travels slowly, its momentum is rather small, and it is very unlikely to cause harm.

In some embodiments, the robot can be configured to travel with a speed of no more than 20 km/h, or no more than 15 km/h, or no more than 10 km/h, preferably between 3 and 8 km/h or, more preferably, between 3 and 5 km/h. As discussed before, this low speed can match the speed of pedestrians using the sidewalks, and minimize any risk of harm to them. Furthermore, the lower speed can allow the robot to take more time to process its surroundings and adjust navigation.

In some embodiments, the robot can comprise the following dimensions: width of 40 to 70 cm, such as about 55 cm, height of 40 to 70 cm, such as about 60 cm, length of 50 to 80 cm, such as about 65 cm. Such dimensions can be optimal for the robot to comfortably fit on sidewalks without inconveniencing pedestrians and still comprise sufficient space for items to be delivered.

In some embodiments, the robot further comprises at least four wheels, preferably at least six wheels. This can be optimal for the robot's stability and the ability to traverse obstacles such as curbstones.

In some embodiments, the compartments of the storage container can comprise a variable length determined by the size of the item to be delivered to its recipient. That is, the separating walls can be placed in such a manner so as to have enough space for the item, but no unnecessary extra space.

In some embodiments, the robot can be configured to transport items from a first location to a plurality of delivery locations. In such embodiments, each item addressed to a different delivery recipient can be stored in a separate compartment during transport by the robot. Each compartment can be configured to be individually locked during transport to the delivery locations. A first compartment comprising a first package authorized for removal by a first recipient at a first delivery location can be configured to be unlocked and opened upon the robot's arrival to the first delivery location. Compartments comprising items not authorized for removal by the first recipient at the first delivery location can be adapted to remain locked and inaccessible to the first delivery recipient at the first delivery location. In this way, security of the packages and privacy of the recipients can be ensured. In some such embodiments, the first compartment can be configured to be unlocked at the first delivery location. The unlocking can be done by the robot detecting that the first delivery location has been reached and unlocking the first compartment. That is, the compartment can be unlocked automatically upon reaching the first delivery location. Additionally or alternatively, the unlocking can also be done by the recipient authorizing unlocking by entering at least one of a command and a code into at least one of the robot and a recipient's mobile device. Additionally or alternatively, the first compartment being unlocked remotely by at least one of a server and an operator terminal can further do the unlocking. That is, a remote server and/or a remote operator (such as a person supervising the robot) can detect that the first delivery location has been reached and/or that the first delivery recipient is ready to remove the package and unlock the first compartment.

In a third embodiment, the invention discloses a method for secure item delivery by a mobile robot to recipients at delivery locations. The method comprises providing a mobile robot comprising a robot body and a robot item space. The method further comprises providing a storage container adapted to be fitted within the robot item space. The storage container comprises a rigid body comprising at least a floor, a front wall, a back wall, a first side wall, and a second side wall. The storage container also comprises at least one separating wall and a plurality of fixing elements configured to removably fix separating walls to the storage container between the front wall and the back wall. The storage container also comprises at least one locking element. The body of the storage container comprises a plurality of compartments separated by the at least one separating wall and configured to be individually lockable via the locking element. The method further comprises placing at least one first item to be delivered to a first recipient at a first delivery location inside a first compartment. The method also comprises locking the first compartment via a first locking element. The method further comprises the mobile robot travelling to the first delivery location. The method also comprises unlocking the first compartment and providing access to the first item to the first delivery recipient. The method further comprises the mobile robot departing the first delivery location.

In such embodiments, the storage container and the mobile robot can comprise any features and elements described above.

In some embodiments, the method can further comprise, prior to the robot travelling to the first delivery location, placing at least one second item to be delivered to a second recipient at a second delivery location inside a second compartment. The method can also comprise locking the second compartment via a second locking element. In such embodiments, the method can also comprise, following the robot departing the first delivery location, the mobile robot travelling to the second delivery location. The method can further comprise unlocking the second compartment and providing access to the second item to the second delivery recipient. The method can also comprise the mobile robot departing the second delivery location.

In some embodiments, each separating wall and at least one of the front wall and the back wall of the storage container can comprise a roll fixedly attached at or near the top of each separating wall and of at least one of the front wall and the back wall, said roll comprising at least a rolled-up position and a plurality of extended positions. In some such embodiments, the first compartment can extend from the front wall to the first separating wall. The step of locking the first compartment can comprise unrolling the first roll over the length of the first compartment between the front wall and the first separating wall and locking the first roll onto the first locking element. In some such embodiments, the step of unlocking the first compartment and providing access to the first item to the first delivery recipient comprises unlocking the first roll from the first locking element and the first roll returning to a rolled-up position.

The present invention is also defined by the following numbered embodiments.

Below is a list of device embodiments. Those will be indicated with a letter "A". Whenever such embodiments are referred to, this will be done by referring to "A" embodiments.

A1. A storage container (1), preferably for secure item delivery, said storage container (1) comprising
  a rigid body (2) comprising at least a floor (3), a front wall (4), a back wall (6), a first side wall (5) and a second side wall (7); and
  at least one separating wall (16, 26); and
  a plurality of fixing elements (8) configured to removably fix separating walls (16, 26) to the storage container (1) between the front wall (4) and the back wall (6); and
  at least one locking element (50, 52, 54); and
  wherein the body (2) of the storage container (1) comprises a plurality of compartments (10, 20, 30) separated by the at least one separating wall (16, 26) and configured to be individually lockable via the locking element (50, 52, 54).

Embodiments Related to Rolls/Slats

A2. A storage container (1) according to the preceding embodiment wherein each separating wall (16, 26) and at least one of the front wall (4) and the back wall (6) comprises a roll (14, 24, 34) fixedly attached at or near the top of each separating wall (16, 26) and at or near the top of at least one of the front wall (4) and the back wall (6), said roll (14, 24, 34) configured to assume at least a rolled up position and a plurality of extended positions.

A3. A storage container (1) according to the preceding embodiment wherein each of the extended positions corresponds to a different length of the roll (14, 24, 34) measured from the wall that it is attached to until the furthest most point of the roll (14, 24, 34).

A4. A storage container (1) according to any of the preceding embodiments and with features of embodiment A2, wherein each of the rolls (14, 24, 34) is configured to serve as lids (12, 22, 32) of the compartments (10, 20, 30) comprising different lengths based on the length of the respective container (10, 20, 30), and wherein different lid lengths correspond to different extended positions of the rolls (14, 24, 34).

A5. A storage container (1) according to any of the preceding embodiments and with features of embodiment A2, wherein the rolls (14, 24, 34) are manufactured at least partially from at least one of metal and a ferromagnetic material.

A6. A storage container (1) according to any of the preceding embodiments and with features of embodiment A2, wherein the rolls (14, 24, 34) comprise slats.

A7. A storage container (1) according to any of the preceding embodiments and with features of embodiment A2, wherein the rolls (14, 24, 34) comprise metal mesh.

A8. A storage container (1) according to the preceding embodiment wherein the rolls (14, 24, 34) comprise two layers of metal mesh with at least one further material placed between, below and/or on top of them.

A9. A storage container (1) according to any of the preceding embodiments and with features of embodiment A2 wherein the rolls (14, 24, 34) comprise a roll fastener located on or near the edge and configured to fasten the roll in the extended positions.

A10. A storage container (1) according to any of the preceding embodiments wherein each separating wall (16, 26) and at least one of the front wall (4) and the back wall (6) comprises a removable lid configured to assume at least an extended and a retracted position.

A11. A storage container (1) according to the preceding embodiment wherein each removable lid comprises a foldable lid.

A12. A storage container (1) according to any of the two preceding embodiments wherein each removable lid comprises slats configured to
  expand over the respective compartment (10, 20, 30) in the extended position so as to make the compartments (10, 20, 30) inaccessible; and
  fold along the respective separating wall (16, 26) and at least one of the front wall (4) and the back wall (6) in the retracted position so as to make the compartments (10, 20, 30) accessible.

A13. A storage container (1) according to the preceding embodiment wherein each removable lid comprises a plurality of extended positions and each extended position corresponds to a different length of the compartments (10, 20, 30).

Embodiments Related to Locking Element

A14. A storage container (1) according to any of the preceding embodiments wherein the locking element (50, 52, 54) is located at or near the top of at least one of the front wall (4), the back wall (6), the separating walls (16, 26) and the side walls (5, 7).

A15. A storage container (1) according to any of the preceding embodiments and with the features of embodiment A2, wherein each of the rolls (14, 24, 34) is configured to be locked to the locking element (50, 52, 54) in each of the extended positions.

A16. A storage container (1) according to any of the preceding embodiments and with features of embodiment A2, wherein each of the rolls (14, 24, 34) is configured to be locked to the respective locking element (50, 52, 54) and wherein upon locking of the respective roll (14, 24, 34) to the respective locking element (50, 52, 54), the respective compartment (10, 20, 30) is inaccessible until unlocking.

A17. A storage container (1) according to any of the preceding embodiments wherein the locking element (50, 52, 54) comprises an electronic lock, preferably an electromagnetic lock, even more preferably a solenoid-based lock.

A18. A storage container (1) according to any of the preceding embodiments wherein the locking element (50, 52, 54) comprises at least one motor.

A19. A storage container (1) according to any of the preceding embodiments and with the features of embodiment A2, wherein the locking element (50, 52, 54) is configured to provide positive engagement between the rolls (14, 24, 34) and the locking element (50, 52, 54)

A20. A storage container (1) according to any of the preceding embodiments and with the features of embodiment A9, wherein at least one of the front wall (4), the back wall (6), the side walls (5, 7) and the separating walls (16, 26) comprise a wall fastener located at or around the top of the respective wall (4, 5, 6, 7, 16, 26) and configured to receive the roll fastener so as to fasten the roll (14, 24, 34) to the respective wall (4, 5, 6, 7, 16, 26) in each of the extended positions.

Embodiments Related to Fixing Elements

A21. A storage container (1) according to any of the preceding embodiments wherein the fixing elements (8) are located in the body of the container (1).

A22. A storage container (1) according to the preceding embodiment wherein the fixing elements (8) comprise slots, preferably with a snap lock mechanism.

A23. A storage container (1) according to the preceding embodiment wherein the lock comprises a spring loaded solenoid.

A24. A storage container (1) according to any of the preceding embodiments wherein the fixing elements (8) are spaced with an interval of 2 to 7 cm.

A25. A storage container (1) according to any of the preceding embodiments wherein each fixing element (8) fixing a separating wall (16, 26) is configured to withstand a separating force of at least 100 N, such as at least 500 N, more preferably at least 1000 N.

A26. A storage container (1) according to any of the preceding embodiments wherein each fixing element (8) fixing a separating wall (16, 26) is configured to be released, thereby releasing the separating wall (16, 26).

A27. A storage container (1) according to the preceding embodiment wherein the release mechanism of the fixing elements (8) is concealed from unauthorized persons.

A28. A storage container (1) according to any of the preceding embodiments wherein the fixing elements are configured to removably fix separating walls (16, 2) to the storage container (1) substantially perpendicularly to at least one of the side walls (5, 7) and the floor (3).

Embodiments Related to Biasing Element

A29. A storage container (1) according to any of the preceding embodiments and with features of embodiment A2, wherein each roll (14, 24, 34) further comprises a biasing element configured to bias the roll (14, 24, 34) towards the rolled up position.

A30. A storage container (1) according to the preceding embodiment wherein the biasing element comprises a spring.

A31. A storage container (1) according to the preceding embodiment wherein the biasing element comprises at least one of a mainspring and a torsion spring.

Embodiments Related to Walls/Compartments

A32. A storage container (1) according to any of the preceding embodiments wherein the compartments (10, 20, 30) comprise a variable length dependent on the placement of the separating walls (16, 26) within the storage container (1).

A33. A storage container (1) according to any of the preceding embodiments wherein each separating wall (16, 26) comprises a width of 0.1 to 2 cm, preferably of 0.1 to 1 cm.

A34. A storage container (1) according to any of the preceding embodiments wherein the container (1) is configured to comprise from two to ten compartments, preferably from two to five compartments.

A35. A storage container (1) according to any of the preceding embodiments and with features of embodiment A2, wherein each compartment (10, 20, 30) comprises a length determined by the placement of the separating walls (16, 26) and by the total length of the container (1), and wherein each compartment (10, 20, 30) is individually lockable by unrolling the respective roll (14, 24, 34) across the top of the respective compartment (10, 20, 30) and locking the respective roll (14, 24, 34) fixedly attached to one of the compartment walls (4, 6, 16, 26) onto the locking element (50, 52, 54) located on the opposite wall from the respective roll (14, 24, 34), thereby creating a respective lid (12, 22, 32) with a total length equal to the respective compartment length and corresponding to one of the respective roll's extended positions.

A36. A storage container (1) according to any of the preceding embodiments further comprising at least one compartment indicator (80) configured to indicate which compartment (10, 20, 30) can be accessed at a given time.

A37. A storage container (1) according to the preceding embodiment wherein the compartment indicator (80) comprises at least one of a LED and a display.

A38. A storage container (1) according to any of the preceding embodiments and with features of embodiment A31 wherein the compartment indicator (80) comprises a mechanical indicator configured to automatically switch between open and closed indicator states based on the locking element (50, 52, 54) being respectively open and closed.

A39. A storage container (1) according to any of the preceding embodiments and with the features of embodiment A2 wherein at least one of the side walls (5, 7) comprise a guiding element configured to guide the rolls (14, 24, 34) into the extended positions.

A40. A storage container (1) according to the preceding embodiment wherein the guiding element comprises a groove running along at least one of the side walls (5, 7) at or near the top of the container (1) at the level of the rolls (14, 24, 34) in the extended positions.

A41. A storage container (1) according to any of the preceding embodiments wherein each compartment (10, 20, 30) further comprises at least one compartment sensor (82) configured to detect whether the respective compartment (10, 20, 30) is locked or unlocked.

A42. A storage container (1) according to the preceding embodiment wherein the compartment sensors (82) comprise at least one of an opto interrupter, a photo interrupter, a magnetic sensor and an inductive sensor.

Embodiments Related to Dimensions

A43. A storage container (1) according to any of the preceding embodiments comprising a volume of 50 to 150 liters, preferably 50 to 100 liters, such as 50 to 80 liters.

A44. A storage container (1) according to any of the preceding embodiments comprising a length of about 30 to 80 cm, preferably 30 to 70 cm, more preferably about 35 to 50 cm.

A45. A storage container (1) according to any of the preceding embodiments comprising a width of about 20 to 70 cm, preferably 20 to 60 cm, more preferably about 30 to 50 cm.

A46. A storage container (1) according to any of the preceding embodiments comprising a height of about 20 to 60 cm, preferably 20 to 50 cm, more preferably about 30 to 50 cm.

Below is a list of system embodiments. Those will be indicated with a letter "S". Whenever such embodiments are referred to, this will be done by referring to "S" embodiments.

S1. A system configured for secure item delivery to recipients at delivery locations, said system comprising a mobile robot (100) configured to at least carry items (18, 28, 38), said robot (100) comprising
- a robot body (110) comprising a robot item space (130);
- a storage container (1) configured to fit within the robot item space (130), said storage container (1) comprising
  - a rigid body (2) comprising at least a floor (3), a front wall (4), a back wall (6), a first side wall (5) and a second side wall (7); and
  - at least one separating wall (16, 26); and
  - a plurality of fixing elements (8) configured to removably fix separating walls (16, 26) to the storage container (1) between the front wall (4) and the back wall (6); and
  - at least one locking element (50, 52, 54); and
  - wherein the body (2) of the storage container (1) comprises a plurality of compartments (10, 20, 30) separated by the at least one separating wall (16, 26) and configured to be individually lockable via the locking element (50, 52, 54).

S2. A system according to the preceding embodiment wherein the robot (100) is at least one of an autonomous and a semi-autonomous robot.

S3. A system according to any of the preceding system embodiments wherein the robot (100) is configured to navigate on pedestrian walkways.

S4. A system according to any of the preceding system embodiments wherein the robot (100) including the carried items weighs no more than 40 kg.

S5. A system according to any of the preceding system embodiments wherein the robot (100) is configured to travel with a speed of no more than 20 km/h, or no more than 15 km/h, or no more than 10 km/h, preferably between 3 and 8 km/h or, more preferably, between 3 and 5 km/h.

S6. A system according to any of the preceding system embodiments wherein the robot (100) comprises the following dimensions: width of 40 to 70 cm, such as about 55 cm, height of 40 to 70 cm, such as about 60 cm, length of 50 to 80 cm, such as about 65 cm.

S7. A system according to any of the preceding system embodiments wherein the robot (100) further comprises at least four wheels, preferably at least six wheels.

S8. A system according to any of the preceding system embodiments wherein the compartments (10, 20, 30) of the storage container comprise a variable length determined by the size of the item (18, 28, 38) to be delivered to its recipient.

S9. A system according to any of the preceding system embodiments wherein the robot (100) is configured to transport items (18, 28, 38) from a first location to a plurality of delivery locations and wherein each item (18, 28, 38) addressed to a different delivery recipient is stored in a separate compartment (10, 20, 30) during transport by the robot (100);
- each compartment (10, 20, 30) is configured to be individually locked during transport to the delivery locations;
- a first compartment (10) comprising a first package (18) authorized for removal by a first recipient at a first delivery location is configured to be unlocked and opened upon the robot's arrival to the first delivery location; and
- compartments (20, 30) comprising items (28, 38) not authorized for removal by the first recipient at the first delivery location are adapted to remain locked and inaccessible to the first delivery recipient at the first delivery location.

S10. A system according to the preceding embodiment wherein the first compartment (10) is configured to be unlocked at the first delivery location by at least one of
- the robot (100) detecting that the first delivery location has been reached and unlocking the first compartment (10); and
- the recipient authorizing unlocking by entering at least one of a command and a code into at least one of the robot (100) and a recipient's mobile device;
- the first compartment (10) being unlocked remotely by at least one of a server and an operator terminal.

S11. A system according to any of the preceding system embodiments wherein the storage container (1) is according to any of the embodiments A1 to A46.

Below is a list of method embodiments. Those will be indicated with a letter "M". Whenever such embodiments are referred to, this will be done by referring to "M" embodiments.

M1. A method for secure item delivery by a mobile robot (1) to recipients at delivery locations, the method comprising
- a. providing
  - a mobile robot (100) comprising a robot body (110) and a robot item space (130); and
  - a storage container (1) adapted to be fitted within the robot item space (130), said storage container (1) comprising
    - a rigid body (2) comprising at least a floor (3), a front wall (4), a back wall (6), a first side wall (5) and a second side wall (7); and
    - at least one separating wall (16, 26); and
    - a plurality of fixing elements (8) configured to removably fix separating walls (16, 26) to the storage container (1) between the front wall (4) and the back wall (6); and
    - at least one locking element (50, 52, 54); and
    - wherein the body (2) of the storage container (1) comprises a plurality of compartments (10, 20, 30) separated by the at least one separating wall (16, 26) and configured to be individually lockable via the locking element (50, 52, 54);
- b. placing at least one first item (18) to be delivered to a first recipient at a first delivery location inside a first compartment (10);
- c. locking the first compartment (10) via a first locking element (50);
- d. the mobile robot (100) travelling to the first delivery location;
- e. unlocking the first compartment (10) and providing access to the first item (18) to the first delivery recipient; and f. the mobile robot (100) departing the first delivery location.

M2. A method according to the preceding embodiment further comprising, prior to step d.
placing at least one second item (28) to be delivered to a second recipient at a second delivery location inside a second compartment (20); and
locking the second compartment (20) via a second locking element (52);
and, following step f.
the mobile robot (100) travelling to the second delivery location;
unlocking the second compartment (20) and providing access to the second item (28) to the second delivery recipient; and
the mobile robot (100) departing the second delivery location.

M3. A method according to any of the preceding method embodiments wherein each separating wall (16, 26) and at least one of the front wall (4) and the back wall (6) of the storage container comprise a roll (14, 24, 34) fixedly attached at or near the top of each separating wall (16, 26) and of at least one of the front wall (4) and the back wall (6), said roll (14, 24, 34) comprising at least a rolled up position and a plurality of extended positions.

M4. A method according to the preceding embodiment wherein the first compartment (10) extends from the front wall (4) to the first separating wall (16) and wherein the step of locking the first compartment (10) comprises unrolling the first roll (14) over the length of the first compartment between the front wall (4) and the first separating wall (16) and locking the first roll (14) onto the first locking element (50).

M5. A method according to the preceding embodiment wherein the step of unlocking the first compartment (10) and providing access to the first item (18) to the first delivery recipient comprises unlocking the first roll (14) from the first locking element (50) and the first roll (14) returning to a rolled up position.

M6. A method according to any of the preceding method embodiments wherein the storage container (1) is according to any of the device embodiments A1 to A46.

M7. A method according to any of the preceding method embodiments wherein the mobile robot (100) is according to any of the system embodiments S1 to S11.

The present technology will now be discussed with reference to the accompanying drawings.

DESCRIPTION OF EMBODIMENTS

Figure 1A:
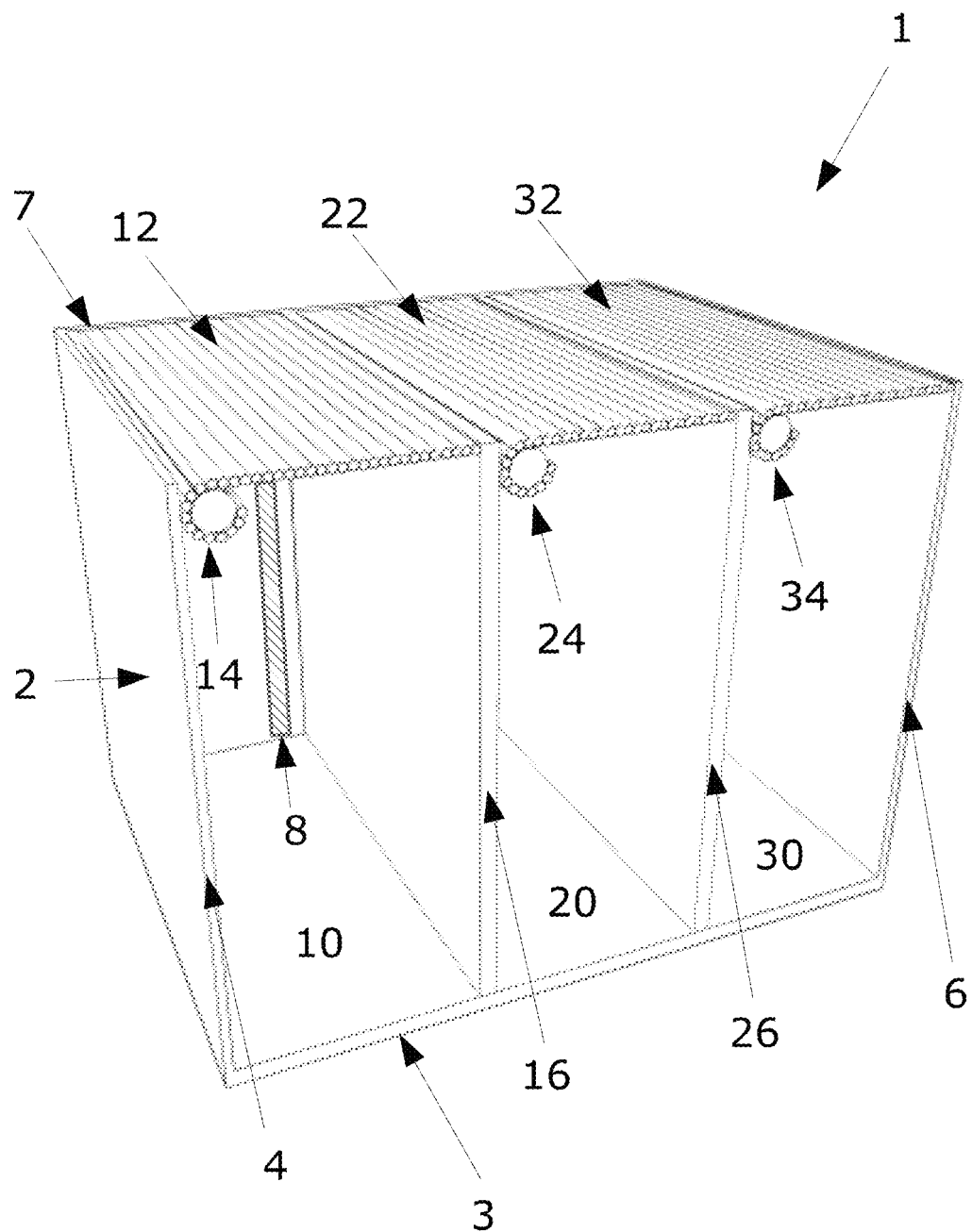
FIGS. 1a and 1b and show an embodiment of a storage container according to one aspect of the invention.
Figure 1B:
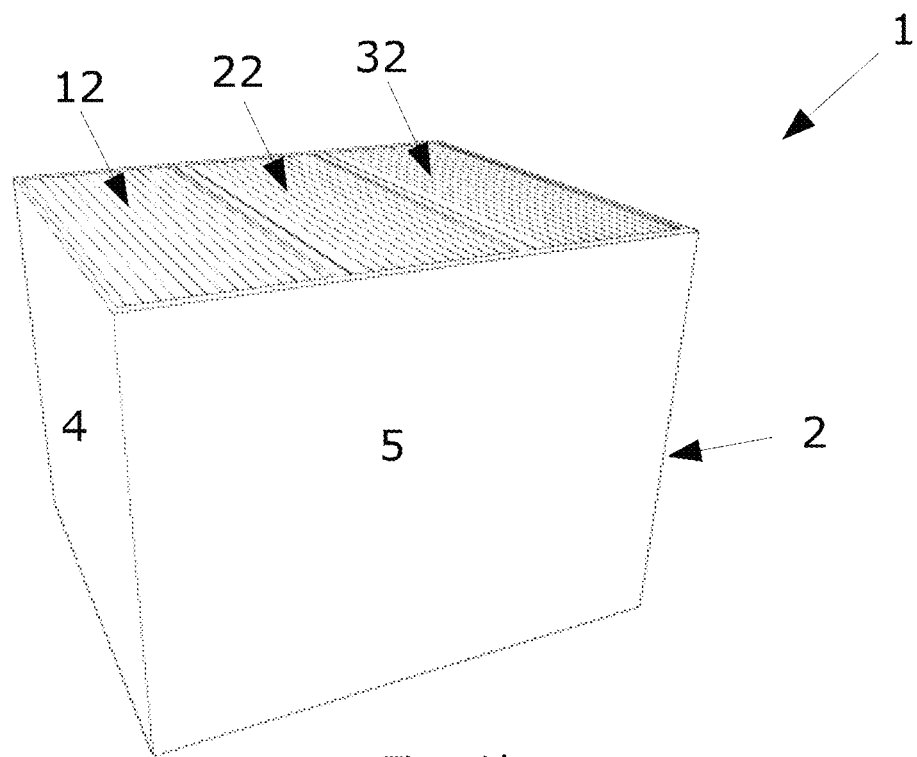

FIGS. 1a and 1b depict an embodiment of a storage container 1 according to one embodiment of the invention. FIG. 1a shows a cross-sectional view with first side wall 5 of the container 1 removed for clarity. FIG. 1b shows a schematic view of the container 1 with the side wall present. The storage container 1 can comprise multiple compartments 10, 20, 30. Those can be used to store items, preferably packages. Packages can refer herein to any deliverable goods such as mail, online or in-store purchases, groceries, take-out, beverages, meals, parcels, flowers or similar objects or items that can be desirable to have delivered. In a preferred embodiment, the container 1 can be placed within a delivery robot. The container 1 can then be used to store packages to deliver to different recipients in different compartments 10, 20, 30. The individual compartments 10, 20, 30 can be closed via lids 12, 22, 32 and can be electronically locked. The delivery robot can then set out to deliver packages to different recipients. As the robot arrives to a particular delivery location, the compartment comprising a package that the recipient is authorized to remove can be unlocked (either remotely, or automatically upon reaching the location, or by the recipient performing a certain operation). The other compartments can remain locked, so that the recipient can only access the compartment comprising a package that they are authorized to remove. In this way, container 1 can be used for safe delivery of individual packages to individuals and/or businesses. This is further illustrated in and discussed in relation to FIG. 4.

The storage container 1 comprises a body 2. The body 2 can preferably be manufactured out of a rigid material such as a rigid plastic. In some embodiments, the body 2 can be of a substantially parallelepipedal shape. The body 2 comprises a floor 3, a front wall 4, a back wall 6, a first side wall 5 and a second side wall 7. The storage container 1 can comprise multiple compartments 10, 20, 30. The compartments 10, 20, 30 can be of the same size and/or of different sizes. In a preferred embodiment, the compartments 10, 20, 30 comprise the same width and height. That is, preferably, each of the compartments 10, 20, 30 extends over the whole width and height of the storage container 1. However, the compartments 10, 20, 30 can comprise a different length. This can be achieved by inserting separating walls 16, 26 at different intervals within the container 1.

The separating walls 16, 26 can be fixed via fixing elements 8 on the side walls 5, 7 of the container 1, for example, by a snap lock. The fixing elements 8 can comprise slots, grooves, and/or similar indentations within the side walls 5, 7. Additionally or alternatively, fixing elements 8 can be located on the floor 3 of the storage container 1. An exemplary fixing element 8 is shown in the figure as a slot 8. The snap lock or similar (not shown) can be such that the release latch is not accessible to unauthorized persons. The lock can comprise a solenoid bolt or lock that can fail safe. The lock can also or additionally comprise an RC servo motor or a similar type of a lock. The fixing elements 8 can be spaced at certain intervals on the side walls 5, 7 and/or on the bottom of the container 1. For example, the fixing elements 8 can be horizontally spaced with a distance between 2 and 5 cm. The smaller the distance between the neighboring fixing elements 8, the more flexibility in compartment size can be achieved. The separating walls 16, 26 can be manufactured from a rigid material such as plastic. In some embodiments, the separating walls 16, 26 can be manufactured from the same material as the container 1. The width of the separating walls 16, 26 can be from 0.1 to 1.0 cm. There can be a plurality of separating walls 16, 26 separating the containers 10, 20, 30. For example, there can be a maximum of 10 compartments 10, 20, 30, all separated from each other by separating walls 16, 26. Since the overall length of the container 1 is usually fixed (apart from potentially different models of container 1), the more compartments 10, 20, 30 it comprises, the narrower each compartment 10, 20, 30 becomes. That is, when larger or longer items such as shoeboxes are placed into the compartments 10, 20, 30, the total number of compartments can be between 2 and 5, while when smaller items such as books are placed into the compartments 10, 20, 30, the total number of compartments can be between 5 and 10. The particular advantage is that the sizes of the compartments 10, 20, 30 can be quickly adjusted while maintaining individual lockable compartments 10, 20, 30.

Each compartment 10, 20, 30 comprises a respective lid 12, 22, 32. In the embodiment depicted in FIGS. 1a and 1b, three compartments 10, 20, 30 are shown, but this is for illustration purposes only. The container 1 can comprise one, two, three, four, five, six, seven, eight, nine, ten or more compartments. First compartment 10 comprises a first lid 12. The first lid 12 comprises a first roll 14. In the following, lids 12, 22, 32 and rolls 14, 24, 34 can be used interchangeably when referring to a closed compartment (that is, a compartment where the "lid" is "on", or the roll is unrolled). When referring to an open compartment, rolls 14, 24, 34 are used, since the "lid" is in a folded state. The lids 12, 22, 32 or rolls 14, 24, 34 can comprise roll up sheets. In some embodiments, rolls 14, 24, 34 can comprise slat rolls. In other preferred embodiments, rolls 14, 24, 34 can comprise metal mesh, metal mesh with a layer of fabric beneath it, and/or two layers of metal mesh with a layer of fabric in-between. The fabric can ensure that the contents of the containers 10, 20, 30 are not visible through the rolls 14, 24, 34. Preferably, the rolls 14, 24, 34 are manufactured at least partially from metal, such as for example aluminum and/or steel. Rolls 14, 24, 34 can also comprise an alloy. Alternatively, the rolls 14, 24, 34 can be manufactured at least partially from plastic. The rolls 14, 24, 34 can be fixedly attached, respectively, to walls 4, 16 and 26 or, to walls 16, 26 and 6. That is, first roll 14 can be fixedly attached on one end either to front wall 4 or to first separating wall 16. In the embodiments depicted in FIGS. 1a, 1b, 1c and 2, the first roll 14 is fixedly attached to the first separating wall 16. Similar applies, mutatis mutandis, to the other rolls 24, 34. The last roll, in this case third roll 34, can be firmly attached either to second separating wall 26 or to back wall 6. In the case depicted in FIGS. 1a, 1b, 1c and 2, third roll 34 is firmly attached to the back wall 6.

Each of the rolls 14, 24, 34 can be unrolled to the length needed to form the lids 12, 22, 32. This length can be variable depending on the desired size of the compartments 10, 20, 30. Once the roll 14, 24, 34 reaches the other side of the compartment (that is, either a separating wall 16, 26, or, in the case of the first roll 14, the front wall 4), it can be electronically locked onto one of the walls 4, 16, 26. Specifically, in the embodiment depicted in FIGS. 1a, 1b, 1c and 2, the first roll 14 can be attached to the front wall 4. This can be done by installing an electronic locking mechanism on the wall 4 and/or at certain intervals on the roll 14. Such intervals can correspond to the intervals between fixing elements that can fix separating walls 16, 26. That is, the intervals at which the rolls 14, 24, 34 comprise locking elements can occur with the same frequency as the fixing elements 8 in the side walls 5, 7 and/or on the bottom of the container 1. The maximum length of each roll 14, 24, 34 can comprise a certain fraction of the length of the container 1. For example, the maximum roll length can comprise from 0.5 to 0.8 of the total container length. Each roll 14, 24, 34 can comprise a biasing element 70, 72, 74, such as a spring (not shown), preferably a torsion spring, that would ensure that it returns to the rolled up position unless acted upon by an opposite force, such as when attached to the opposite wall.

In some embodiments, the side walls 5,7 can also comprise a groove or an indentation running along one or both of them (not depicted). Such an indentation can help guy the rolls 14, 24, 34 as they are unrolled or rolled back.

The dimensions of the container 1 can be as follows. The storage container 1 can comprise a volume of 30 to 100 l, preferably 50 to 80 l, even more preferably 60 to 70 l. The length of the storage container 1 can comprise 30 to 80 cm, preferably 30 to 70 cm, more preferably about 30 to 50 cm. The width of the storage container 1 can comprise 20 to 70 cm, preferably 20 to 60 cm, more preferably 20 to 50 cm. The height of the storage container 1 can comprise 20 to 60 cm, preferably 20 to 50 cm, more preferably 30 to 50 cm.

Figure 1C:
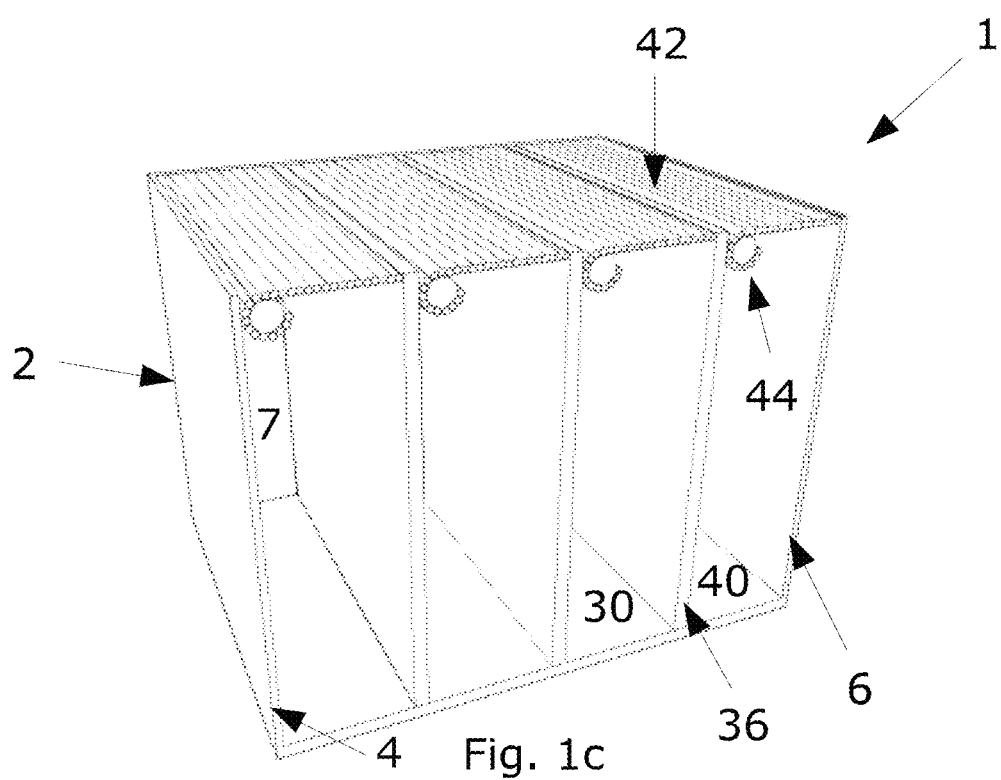
FIG. 1c shows another embodiment of a storage container with a plurality of compartments according to one aspect of the invention.

FIG. 1c depicts an embodiment of the storage container 1 comprising four compartments. Fourth compartment 40 similarly comprises lid 42 that can comprise a roll 44. The placement of the third separating wall 36 can determine the length of third compartment 30 and fourth compartment 40. In this embodiment, the fourth roll 44 is fixedly attached to the back wall 6. The fourth roll 44 can be unrolled until it reaches the third separating wall 36. At this point, it can be locked onto it by an electronic locking mechanism (not shown).

Figure 2:
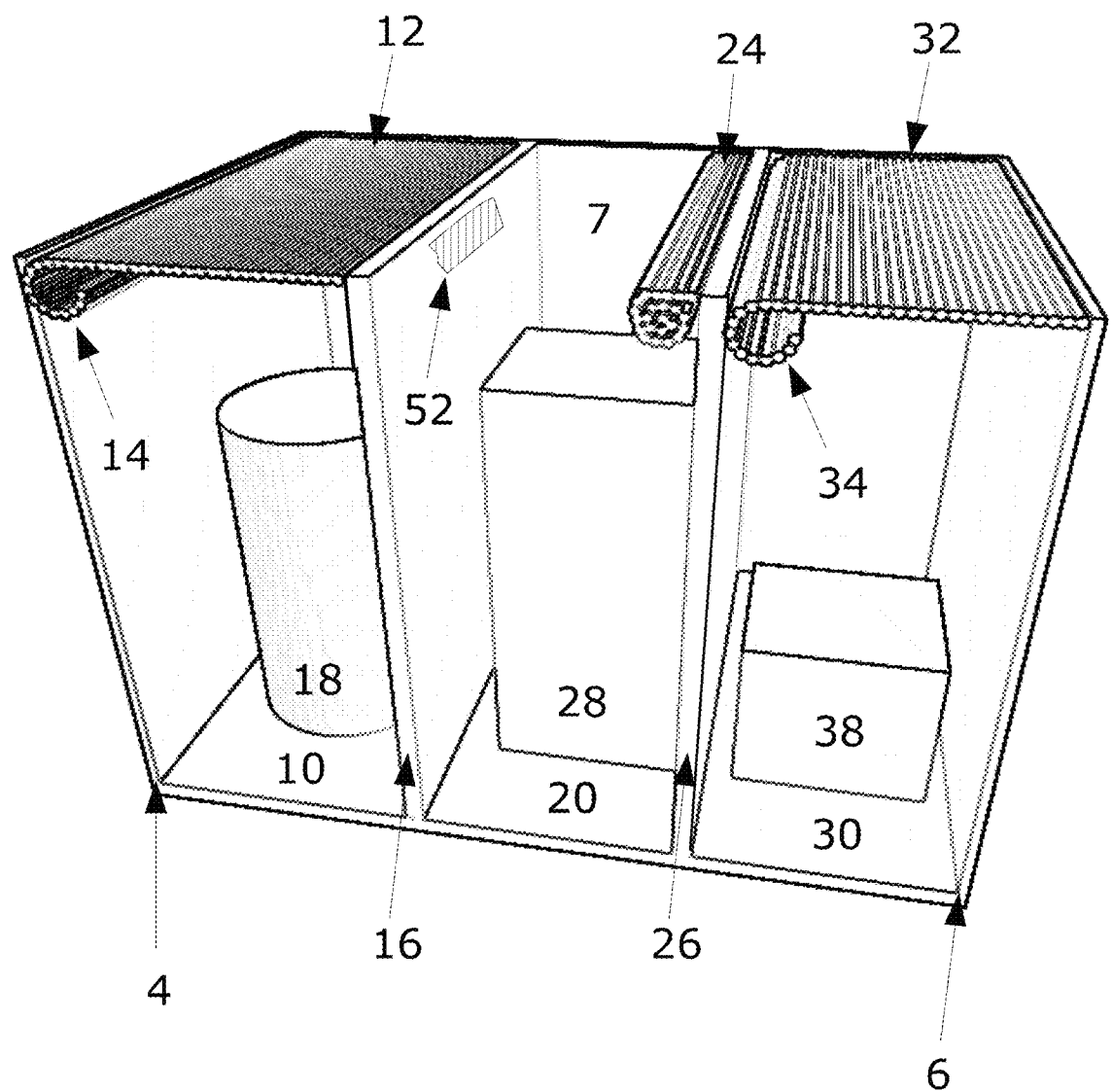
FIG. 2 shows an embodiment of a storage container with packages or items in respective compartments and with one compartment accessible according to one aspect of the invention.

FIG. 2 depicts an embodiment of the storage container 1 comprising packages 18, 28, 38. Similarly to FIG. 1a, this is a cross-sectional view with the first side wall 5 removed for clarity. First package 18 is placed inside first compartment 10, second package 28 is placed inside second compartment 20 and third package 38 is placed inside third compartment 30. Note, that one package per compartment is depicted, but there can be more than one package in each compartment. In the preferred embodiment where the storage container 1 is used as part of package delivery to recipients, a plurality of packages addressed to the same recipient and/or household and/or business can all be placed in the same compartment.

FIG. 2 shows an embodiment where second lid 22 is "open". That is, second roll 24 is rolled up and not preventing access to the second compartment 20 any longer. Therefore, the second package 28 is accessible, and a recipient and/or an authorized person can proceed to remove it. First lid 12 and second lid 32 are closed. That is, first roll 14 and third roll 34 are unrolled so as to form, respectively, lids 12 and 32, and to prevent access to the first compartment 10 and to the third compartment 30. Therefore, a person authorized to withdraw only the second package 28 does not have access to the first package 18 or to the third package 38 without breaking the locks or otherwise damaging the storage container 1.

Also depicted in FIG. 2 is a second locking element 52. The second locking element 52 is shown on a first separating wall 16. The second locking element 52 can comprise an electronic lock. Corresponding locking parts can also be embedded into the roll 24 at specific intervals, allowing the roll 24 to serve as a lid of different lengths. The second locking element 52 can comprise, for example, a solenoid-based lock. Note, that only the second locking element 52 is depicted in FIG. 2, but also a first locking element 50 and a third locking element 54 are implicitly present, as they are locking the lids 12 and 32 respectively. In some embodiments, the locking elements 50, 52, 54 can comprise an electromagnet (such as, for example, a solenoid) and the rolls 14, 24, 34 can be manufactured at least partially from a ferromagnetic material or of slats of ferromagnetic material, allowing them to serve as armature plates for the locking element 50, 52, 54. Additionally or alternatively, locking elements 50, 52, 54 can comprise a mechanical lock, or a mix of an electronic and a mechanical lock. Locking elements 50, 52, 54 can comprise pins that can be actuated via a motor, such as an rc servo. The pins can comprise an "open" and a "closed" state, corresponding to the rolls 14, 24, 34 being locked onto them. For example, the pins can slide into holes on the rolls 14, 24, 34.

Each of the separating walls 16, 26 can comprise an individual locking element 50, 52, 54. Furthermore, either the front wall 4 or the back wall 6 can comprise locking element 50, 52, 54 as well, so that the first, or, respectively, the last roll can be locked onto it. In the depicted embodiment, the front wall 4 can comprise a first locking element 50 (not shown).

The locking elements 50, 52, 54 can also be alternatively or additionally placed on the side walls 5, 7. In one embodiment, locking elements 50, 52, 54 can be configured to lock both the separating walls and the rolls. In such embodiments, the rolls can be unlocked without unlocking the walls, so that the integrity of the compartments 10, 20, 30 can be maintained. Additionally or alternatively, the rolls 14, 24, 34 can be configured to be locked onto the fixing elements 8. For example, the rolls 14, 24, 34 can lock onto a fixing element 8 adjacent to the one onto which the separating walls 16, 26 are locked.

The locking element 50, 52, 54 can comprise an electronic lock. That is, the lock can be locked and/or unlocked based on specific commands from an electronic medium. For example, in the specific example where the storage container 1 is used within a package delivery context, for example as part of a delivery robot, the locking element 50, 52, 54 can be unlocked by a specific input from a recipient (such as entering a command or a code on a recipient's mobile device and/or on a robot), by a remote input (such as from a remote server and/or from a remote operator terminal), and/or automatically upon detecting that a particular delivery location has been reached. The locking element 50, 52, 54 can comprise a locked configuration and an unlocked configuration. In the locked configuration, the second roll 24 can be fixedly attached to the second locking element 52 (or any other roll with another locking element respectively), thereby forming the second lid 22. In the unlocked configuration, the second locking element 52 can exert no force upon the second roll 24. The second roll 24 can therefore revert to a rolled up position. In this position (which is depicted in FIG. 2), the second lid 22 is not present, and access to the second compartment 20 and the second delivery 28 within it is not obstructed. The rolls 14, 24, 34, can comprise a biasing means (not shown), which exerts a force prompting the rolls to roll up in the absence of a force from the locking element 50, 52, 54. That is, when the locking element 50, 52, 54 is in the unlocked configuration, the rolls 14, 24, 34 can roll back up towards the wall to which they are fixedly attached (in the case of the second roll 24 depicted on FIG. 2, this refers to rolling back up towards the second separating wall 26). The force between the locking element 50, 52, 54 and the rolls 14, 24, 34 when they are locked can be at least 100 N, such as at least 500 N, more preferably at least 1000 N.

Figure 3:
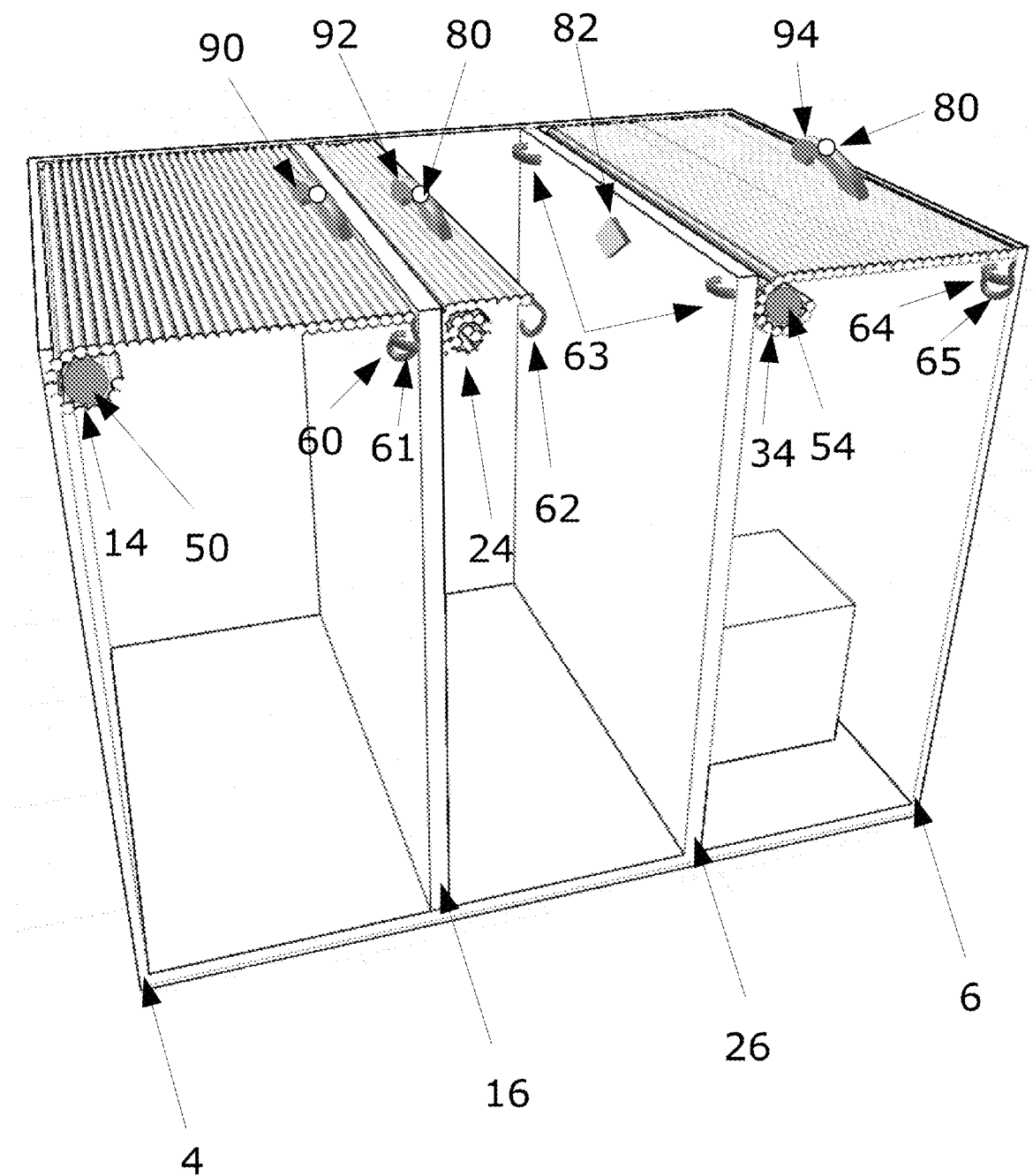
FIG. 3 shows an embodiment of a storage container with further optional features schematically demonstrated.

FIG. 3 depicts another embodiment of a storage container with further optional elements shown. The rolls 14, 24, 34 are fixedly attached to the front wall 4, the first separating wall 16 and the second separating wall 26 respectively (in contrast to the embodiments depicted in FIGS. 1*a*, 1*b*, 1*c* and 2). That is, the free end of the roll 14, 24, 34 gets unrolled in this case, and the remaining part of the roll remains fixed. This can, for example, be done via a roll support that can be attached to the walls (not shown here). In this way, the roll can still rotate and unroll (respectively, roll back), while the support is attached to one of the walls.

FIG. 3 also schematically shows a different variation of locking element 50, 52, 54. The first and the third locking elements 50 and 54 are shown inside the rolls 14 and 34 respectively. That is, in the present embodiment, the locking elements 50, 52, 54 can comprise bolts that prevent the rolls 14, 24, 34 from unrolling when in the locked configuration. The bolts can be part of an electronic lock, that can be placed inside the side walls 5, 7, or inside the walls to which the rolls are fixedly attached. Additionally or alternatively, the locking elements 50, 52, 54 can be placed directly inside the rolls 14, 24, 34 that they are configured to lock.

FIG. 3 further depicts roll fasteners 60, 62, 64 and wall fasteners 61, 63, 65. The roll fasteners 60, 62, 64 are attached to the free end of the rolls 14, 24, 34. The wall fasteners 61, 63, 65 are attached to the separating walls 16, 26 and to one of the front wall 4 and back wall 6 (in the embodiment depicted on FIG. 3, third wall fastener 65 is attached to the back wall 6).

The roll fasteners 60, 62, 64 can comprise metal or plastic pieces, that can be bent, shaped like hooks or comprise a different shape. In the schematic embodiment depicted in FIG. 3, the roll fasteners 60, 62, 64 are shown as hooks. Each roll can have one or a plurality of roll fasteners. In the case of one roll fastener, it can be preferably attached in the middle of the free end of the roll. In the embodiment depicted in FIG. 3, two roll fasteners are present on each roll, attached to the opposite sides of it (only one is shown due to the perspective).

The wall fasteners 61, 63, 65 can comprise metal or plastic pieces that can in the simplest form be shaped as hoops. Such an embodiment is shown in FIG. 3. There can be one or a plurality of wall fasteners 61, 63, 65 attached to each of the walls (except for the front wall 4 in this particular embodiment). The wall fasteners 61, 63, 65 can be placed correspondingly to the roll fasteners 60, 62, 64, so that the two may be joined together. In some embodiments, the wall fasteners 61, 63, 65, can comprise a groove, such as a groove, an indentation or a hole on the respective wall.

The roll fasteners 60, 62, 64 and the wall fasteners 61, 63, 65 can be configured to attach so as to prevent the rolls 14, 24, 34 from rolling back and to ensure that the compartments 10, 20, 30 remain closed.

In one embodiment, the roll fasteners 60, 62, 64 and the wall fasteners 61, 63, 65 can be configured to be disconnected by pulling the respective roll 14, 24, 34 upwards and/or forwards when the roll is unlocked. To facilitate this, gripping elements 90, 92, 94 are attached to the top of the rolls 14, 24, 34. That is, in such an embodiment, pulling on the respective gripping element 90, 92, 94 disconnects the respective roll fastener 60, 62, 64 and the wall fastener 61, 63, 65, so that the respective compartment 10, 20, 30 can be accessed. When the respective roll 14, 24, 34 is locked, pulling the gripping element 90, 92, 94 does not lead to the roll unrolling further, and therefore the compartment 10, 20, 30 remains locked. Such an embodiment comprises a locking element 50, 52, 54 that is configured to prevent the roll 14, 24, 34 from unrolling or rolling back in the locked configuration.

In another embodiment (not shown here), the locking element 50, 52, 54 can be located at or near the roll fasteners 60, 62, 64 and/or the wall fasteners 61, 63, 65. Such a locking element can comprise an electronic lock with a bolt preventing the respective wall and roll fasteners to be disconnected in the closed state.

FIG. 3 also depicts indicators 80, placed on the gripping element 90, 92, 94. The indicators 80 can serve to indicate which compartment can be opened. That is, in embodiments where the invention is used as part of a delivery system, the indicators 80 can serve to inform delivery recipients which compartment 10, 20, 30 their package is in. This can be particularly advantageous in embodiments where the recipient needs to open the compartment 10, 20, 30 manually by pulling on the gripping element 90, 92, 94. The indicators can comprise LED lights, or mechanical switches comprising at least two modes corresponding to "compartment should be opened" and "compartment should not be opened". In the case of LEDs, the correct compartment to open can be indicated by a green LED, while the other compartments can be indicated by a red LED. The indicators 80 can also be placed elsewhere on the container 1. For example, the indicators can comprise an arrow with an LED placed on the separating walls, or indicators can be inbuilt into the rolls 14, 24, 34 directly.

FIG. 3 finally depicts a compartment sensor 82. The compartment sensor 82 can be configured to detect whether a compartment is open or closed. This can be useful in case of unauthorized access to one of the compartments. The compartment sensor 82 can comprise an opto interrupter, a photo interrupter, a magnetic sensor or an inductive sensor, or any combination of such sensors. In the depicted embodiment, the compartment sensor 82 is located on one of the separating walls. The compartment sensor 82 can also be located elsewhere, such as for example on the rolls 14, 24, 34.

Figure 4:
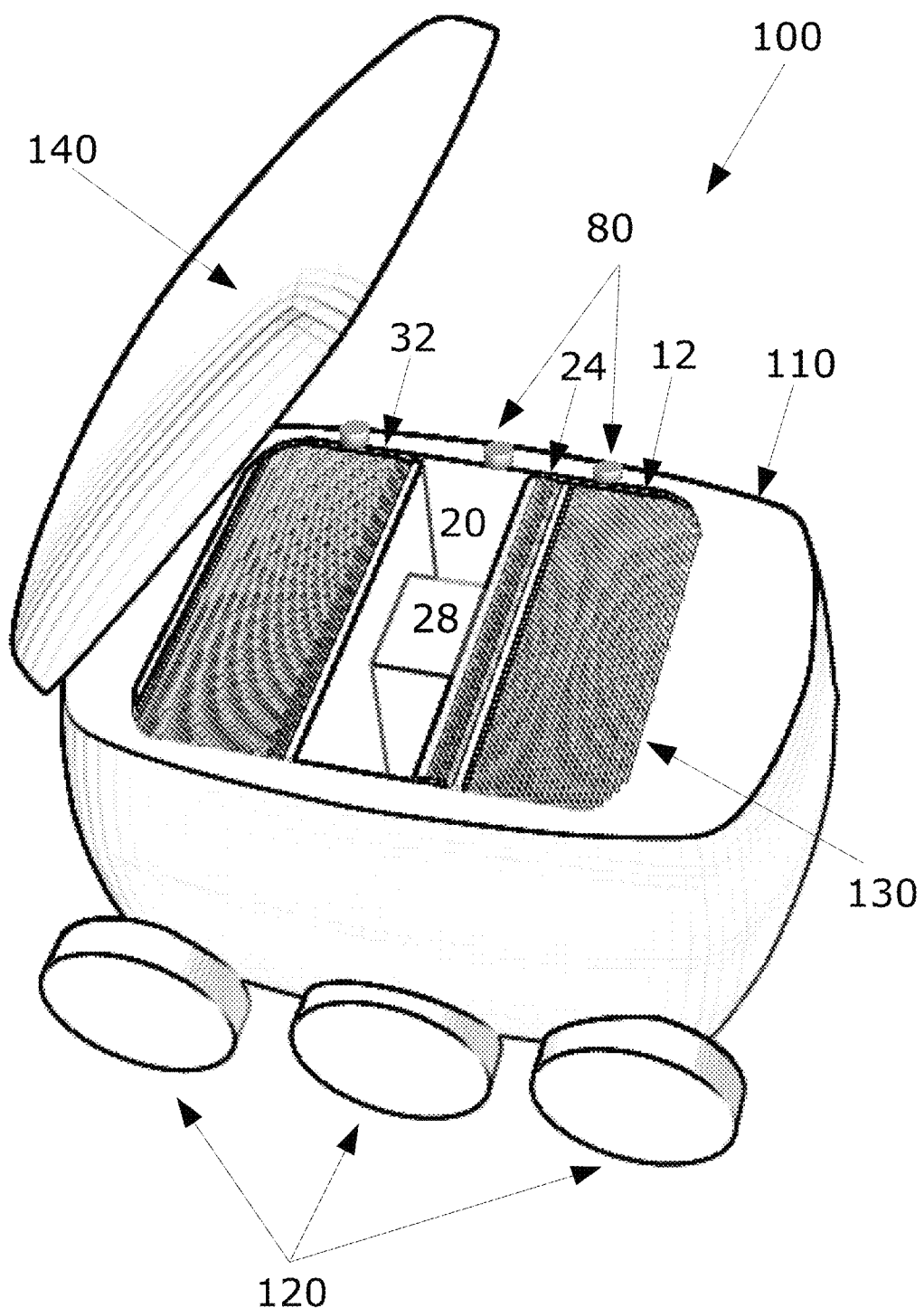
FIG. 4 shows an embodiment of a mobile robot comprising a storage container with multiple compartments according to one aspect of the invention.

FIG. 4 depicts a schematic embodiment of a storage container 1 placed within a mobile robot 100. The mobile robot 100 can, for example, be a delivery robot. That is, the mobile robot 100 can be adapted to transport packages from a first location towards different delivery locations and the corresponding package recipients. The mobile robot 100 can comprise a robot body 110, that can also be referred to as a frame 110. It can be preferably made of plastic for safety, energy saving, cost reasons. The mobile robot 100 further comprises wheels 120. In the present depiction, there are six wheels 120, but the number can be anywhere between four and eight wheels 120. The mobile robot 100 is a land-based robot and can be particularly adopted for operation on walkways, sidewalks and other pedestrian paths.

The mobile robot 100 further comprises package space 130. The package space 130 can be covered via a lid 140. The robot 100 can further comprise a lock such as an electronic lock (not shown) that can lock the lid 140 to the robot body 110 and prevent unauthorized persons from accessing the package space 130. Such a lock can also be optional when each of the container's compartments 10, 20, 30 are individually lockable. The storage container 1 can be placed within the package space 130 of the mobile robot 100. The packages that the mobile robot 100 can transport to their recipients can be placed within the individual compartments 10, 20, 30 of the storage container 1.

FIG. 4 also shown another placement of the indicators 80. Here, the indicators are placed on the robot body 110, for example at even intervals. The indicator closest to the compartment that is accessible can change color or change configuration to indicate to the delivery recipient the compartment to open.

The mobile robot 100 can be loaded with the individual packages at a first location. Such a location can, for example, be a local hub where packages are first brought by larger vehicles operating on public roads. For example, a local hub can comprise a storage container with space for packages to be stored until they can be delivered via the mobile robot 100. The packages 18, 28, 38, can be assigned to a particular robot based on the location to which they should be delivered. For example, delivery locations within a few kilometers of each other (such as within 2 or 3 km) can be considered close enough to be serviced by one robot during one robot run. The size of the individual packages 18, 28, 38 can determine the necessary size of the compartments 10, 20, 30. That is, separating walls 16, 26 can be fixed at different locations within the side walls 5, 7 of the storage container 1 depending on how much space the individual packages 18, 28, 38 require. Once the separating walls 16, 26 are fixed (for example, using snap locks or electronic locks), the packages 18, 28, 38 can be placed within the compartments 10, 20, 30, and the rolls 14, 24, 34 can be unrolled to create lids 12, 22, 32. The rolls 14, 24, 34 can then be locked using the locking element 50, 52, 54. During transport to the first delivery location, all lids 12, 22, 32 can be locked and none of the individual compartments 10, 20, 30 accessible. Once the mobile robot 100 arrives at the first delivery location, the lid corresponding to the package that should be delivered at this location can be unlocked, and the corresponding roll can roll back up due to biasing means (not shown). The recipient and/or the authorized person can then access the compartment 10, 20, 30 comprising their package. For example, the second package 28 can be delivered at a first delivery location. Once the recipient removes the second package 28, the second compartment 20 can remain unlocked for the rest of the robot's run, as it does not contain other packages. The robot 100 can then proceed to a second delivery location, where the compartment comprising the package to be delivered at this second delivery location can be unlocked, and the corresponding package removed by the recipient and/or by the authorized person. This next compartment can then also remain unlocked for the remainder of the robot's run. The robot can proceed in such a way until all of the packages 18, 28, 38 within the individual compartments 10, 20, 30 have been removed. When the last package has been removed, the robot 100 can return to the first location from which it started and/or return to a final location different from said first location depending on the robot's instructions. The robot 100 can then be loaded with a new set of packages 18, 28, 38 and proceed on to another run. At this point, the positions of the separating walls can be adjusted based on the dimensions of the new set of packages.

In another exemplary embodiment, the mobile robot 100 with the container 1 inside it can be used for both deliveries and returns or pick-ups. For example, the robot 100 can travel to a first location where a recipient can remove a first package. The robot 100 can then travel to a second location where a sender can place a second package into one of the unlocked compartments 10, 20, 30 and then close it. The compartments can then be locked remotely, for example after the recipient indicates that the package to be returned is placed into the compartment and the roll 14, 24, 34 is unrolled, so that it can be locked.

It can be particularly efficient to conduct several deliveries and/or returns with a single robot run, if the recipients and/or senders live within a relatively compact area. This can significantly reduce the cost of deliveries, and make the robotic delivery or returns collection very efficient.

The efficiency of the delivery/return process can be further increased by re-using the compartments 10, 20, 30 that have become free during the course of a robot run to collect further returns. That is, the robot 100 can travel to a first destination, deliver a second package 28 from the second compartment 20, travel to a second destination, receive a first return item and have it locked inside the same compartment 20. This can double the amount of packages the robot can deliver and/or pick up, provided that the packages are similar in size. The mobile robot 100 can weight no more than about 40 kg including the insulated bag 1 and any packages the robot carries. The mobile robot 100 can be adapted to travel with a speed of no more than 20 km/h, or no more than 15 km/h, or no more than 10 km/h, preferably between 3 and 8 km/h or, more preferably, between 3 and 5 km/h.

In one particular embodiment, the dimensions of the robot 100 can be as follows. Width: 40 to 70 cm, such as about 55 cm, height: 40 to 70 cm, such as about 60 cm, length: 50 to 80 cm, such as about 65 cm.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

I claim:

1. A storage container comprising:
   a rigid body comprising at least a floor, a front wall, a back wall, a first side wall and a second side wall; and
   at least one separating wall; and
   a plurality of fixing elements configured to removably fix the at least one separating wall to the storage container between the front wall and the back wall; and
   at least one locking element; and
   wherein the body of the storage container comprises a plurality of compartments separated by the at least one separating wall and configured to be individually lockable via a respective locking element of the at least one locking elements,
   wherein each of the at least one separating wall and at least one of the front wall and the back wall comprises a respective roll fixedly attached at or near the top of each of the at least one separating wall and at or near the top of at least one of the front wall and the back wall,
   wherein each roll is configured to assume at least a rolled up position and a plurality of extended positions, and
   wherein each roll is configured to be locked to the respective locking element and wherein upon locking of the respective roll to a respective one of the at least one locking element, a respective one of the compartments is inaccessible until unlocking.

2. The storage container according claim 1, wherein each roll is configured to serve as a lid of a respective one of the compartments and to comprise a different length based on the length of the respective compartment, and wherein different lengths correspond to different extended positions of the rolls.

3. The storage container according to claim 1, wherein each roll comprises at least one of:
   slats; and/or
   metal mesh; and/or
   two layers of metal mesh with at least one further material placed between, below and/or on top of them.

4. The storage container according to claim 1, wherein the fixing elements are located in the body of the storage container and comprise slots.

5. The storage container according claim 1, wherein each roll further comprises a biasing element configured to bias the roll towards the rolled up position.

6. The storage container according to claim 1, wherein each compartment comprises a length determined by a placement of the at least one separating wall and by a total length of the storage container, and wherein each compartment is individually lockable by unrolling the respective roll across the top of the respective compartment and locking the respective roll fixedly attached to one of the compartment walls onto the locking element located on the opposite wall from the respective roll, thereby creating a respective lid with a total length equal to the respective compartment length and corresponding to one of the respective roll's extended positions.

7. The storage container according to claim 1, further comprising at least one compartment indicator configured to indicate which compartment can be accessed at a given time.

8. The storage container according to claim 1, wherein each compartment further comprises at least one compartment sensor configured to detect whether the respective compartment is locked or unlocked.

9. A storage container comprising:
   a rigid body comprising at least a floor, a front wall, a back wall, a first side wall and a second side wall;
   at least one separating wall; and
   a plurality of fixing elements configured to removably fix the at least one separating wall to the storage container between the front wall and the back wall; and
   at least one locking element,
   wherein the body of the storage container comprises a plurality of compartments separated by the at least one separating wall and configured to be individually lockable via a respective locking element of the at least one locking elements,
   wherein each of the at least one separating wall and at least one of the front wall and the back wall comprises a respective removable lid attached at or near the top of each of the at least one separating wall and at or near the top of at least one of the front wall and the back wall, said removable lid configured to assume at least an extended and a retracted position,
   wherein each removable lid comprises slats configured to:
   expand over a respective one of the compartments in the extended position so as to make the respective compartment inaccessible; and
   fold along the respective separating wall and at least one of the front wall and the back wall in the retracted position so as to make the respective compartment accessible, and wherein each removable lid is configured to be locked to the respective locking element and wherein upon locking of the respective removable lid to a respective one of the at least one locking element, a respective one of the compartments is inaccessible until unlocking.

\* \* \* \* \*